(12) United States Patent
Cline

(10) Patent No.: US 8,484,914 B2
(45) Date of Patent: Jul. 16, 2013

(54) SEALING SYSTEM

(76) Inventor: Roger M. Cline, Bluemont, VA (US)

( * ) Notice: Subject to any disclaimer, the term of this patent is extended or adjusted under 35 U.S.C. 154(b) by 286 days.

(21) Appl. No.: 12/803,176

(22) Filed: Jun. 21, 2010

(65) Prior Publication Data
US 2011/0000154 A1    Jan. 6, 2011

Related U.S. Application Data

(60) Provisional application No. 61/269,098, filed on Jun. 19, 2009.

(51) Int. Cl.
| | | |
|---|---|---|
| *E04H 12/28* | (2006.01) | |
| *E04D 13/14* | (2006.01) | |
| *E04D 1/36* | (2006.01) | |
| *E04D 3/38* | (2006.01) | |
| *E04G 15/06* | (2006.01) | |
| *E04G 21/00* | (2006.01) | |
| *E04G 23/00* | (2006.01) | |
| *E04B 1/00* | (2006.01) | |
| *E04D 13/147* | (2006.01) | |
| *E04F 17/02* | (2006.01) | |
| *C04B 111/00* | (2006.01) | |

(52) U.S. Cl.
CPC ........ *E04D 13/1407* (2013.01); *E04D 13/1476* (2013.01); *E04F 17/02* (2013.01); *E04D 13/1415* (2013.01); *C04B 2111/00482* (2013.01)
USPC .................................. 52/219; 52/58; 52/741.4

(58) Field of Classification Search
USPC . 52/58–60, 198, 199, 219, 741.4; 285/42–45; 277/312, 628
See application file for complete search history.

(56) References Cited

U.S. PATENT DOCUMENTS

| | | | | |
|---|---|---|---|---|
| 1,258,884 | A * | 3/1918 | Fife | 285/4 |
| 1,282,535 | A * | 10/1918 | Bropson | 285/44 |
| 1,287,235 | A * | 12/1918 | Cole | 285/44 |
| 2,510,926 | A * | 6/1950 | Goldstein | 285/43 |
| 3,087,745 | A * | 4/1963 | Rumbell | 285/222.1 |
| 3,098,663 | A * | 7/1963 | Dibley | 285/43 |
| RE26,026 | E * | 5/1966 | Dibley | 285/43 |
| 3,313,559 | A * | 4/1967 | Kifer | 285/43 |
| 3,731,952 | A * | 5/1973 | Elwart | 285/3 |
| 3,977,137 | A * | 8/1976 | Patry | 52/60 |
| 4,010,578 | A | 3/1977 | Logsdon | |
| 4,211,423 | A * | 7/1980 | Resech | 277/636 |
| 4,265,058 | A * | 5/1981 | Logsdon | 52/58 |

(Continued)

FOREIGN PATENT DOCUMENTS

| | | |
|---|---|---|
| JP | 08085965 | 4/1996 |
| JP | 10030756 | 2/1998 |
| WO | 2009039562 | 4/2009 |

*Primary Examiner* — Brian Glessner
*Assistant Examiner* — Theodore Adamos
(74) *Attorney, Agent, or Firm* — James Creighton Wray

(57) ABSTRACT

A silicone seal for surrounding and sealing an object has spaced thick beads and a rigid ring positioned between the beads. When the silicone seal is slid on the object, the silicone is compressed between the ring and the object and between the beads and the object. A plate has a flat base and an angular raised central portion with a ledge at an angle to the base. The silicone continues downward from the seal through a flexible middle to an enlarged part which has a complementary ledge that is seated on the plate ledge. An end of the large part is joined to the plate inward of the ledge.

18 Claims, 36 Drawing Sheets

U.S. PATENT DOCUMENTS

| | | | |
|---|---|---|---|
| 4,333,660 A | 6/1982 | Capit | |
| 4,512,119 A | 4/1985 | Willoughby | |
| 4,563,847 A | 1/1986 | Hasty | |
| 4,570,943 A | 2/1986 | Houseman et al. | |
| 4,768,812 A * | 9/1988 | Katz | 285/43 |
| 4,864,782 A | 9/1989 | Hasty | |
| 5,018,748 A * | 5/1991 | Schalle | 277/641 |
| 5,036,636 A | 8/1991 | Hasty | |
| 5,176,408 A | 1/1993 | Pedersen | |
| 5,222,334 A * | 6/1993 | Hasty | 52/100 |
| 5,226,263 A | 7/1993 | Merrin et al. | |
| 5,347,776 A | 9/1994 | Skoff | |
| 5,588,267 A * | 12/1996 | Rodriguez et al. | 52/219 |
| 5,703,154 A * | 12/1997 | Davis et al. | 524/525 |
| 5,860,256 A * | 1/1999 | Humber | 52/219 |
| 6,122,870 A | 9/2000 | Marcum | |
| 6,279,272 B1 | 8/2001 | Nill, Jr. | |
| 7,814,709 B1 * | 10/2010 | Resech | 52/58 |
| 2006/0130411 A1 | 6/2006 | Edgar et al. | |
| 2008/0098673 A1 | 5/2008 | Johnston et al. | |

* cited by examiner

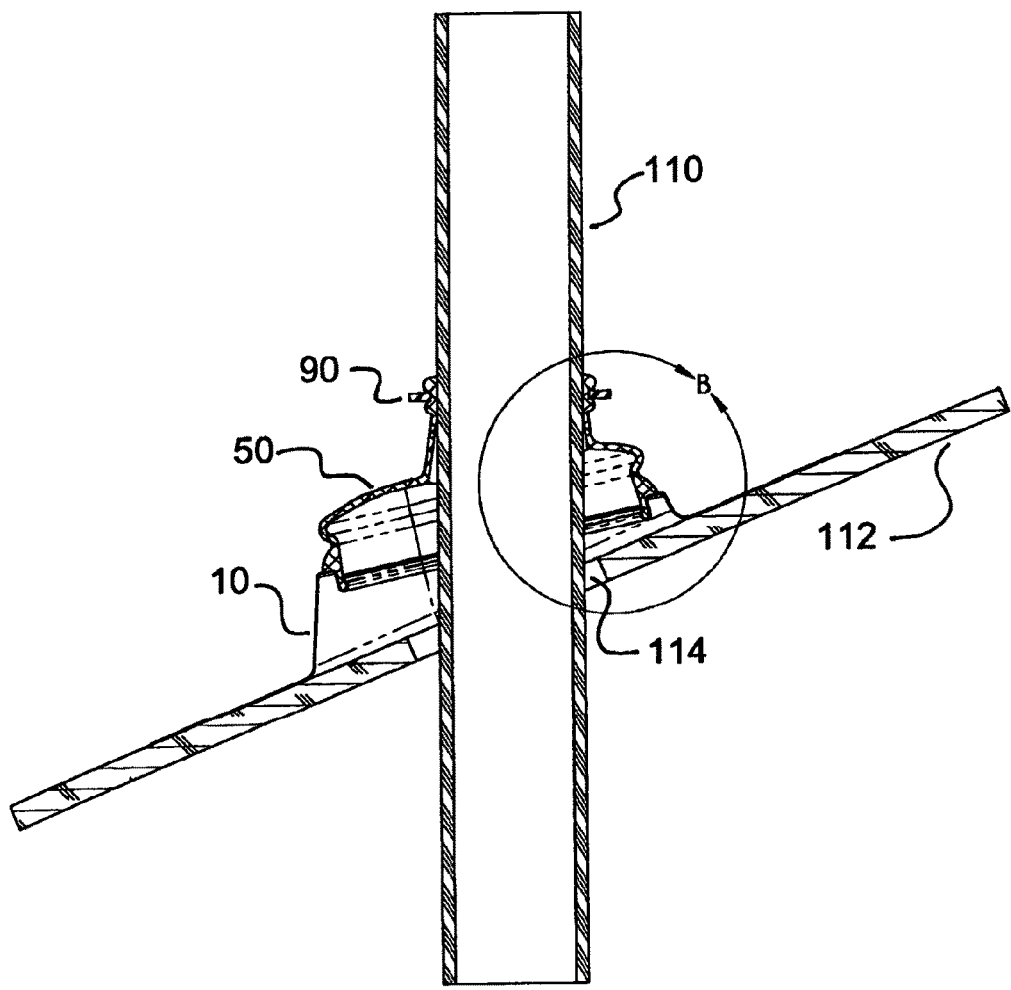
Figure 3-AA

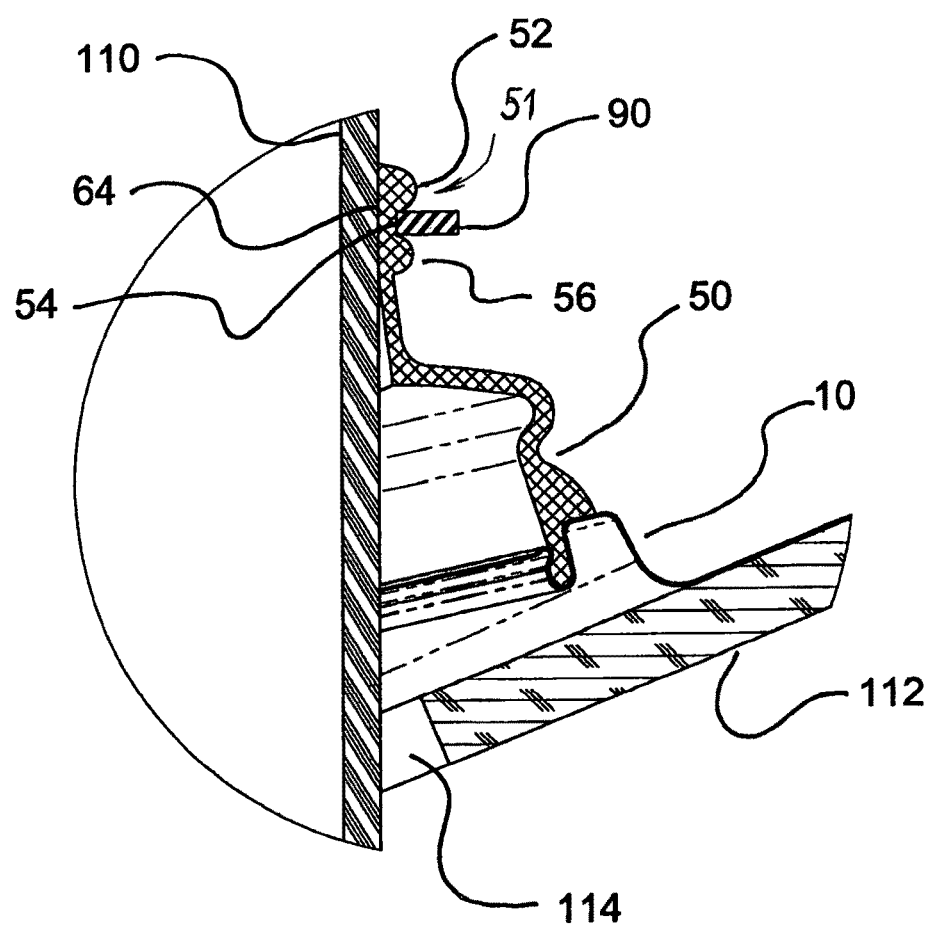
Figure 3-B

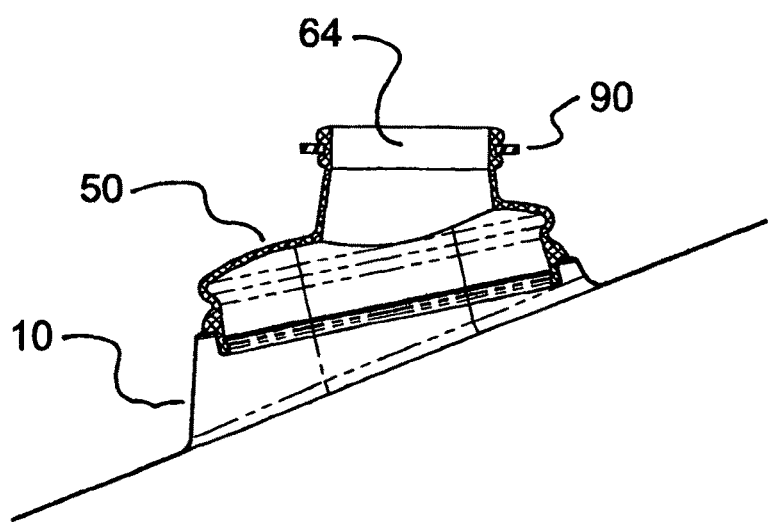
Figure 5-AA

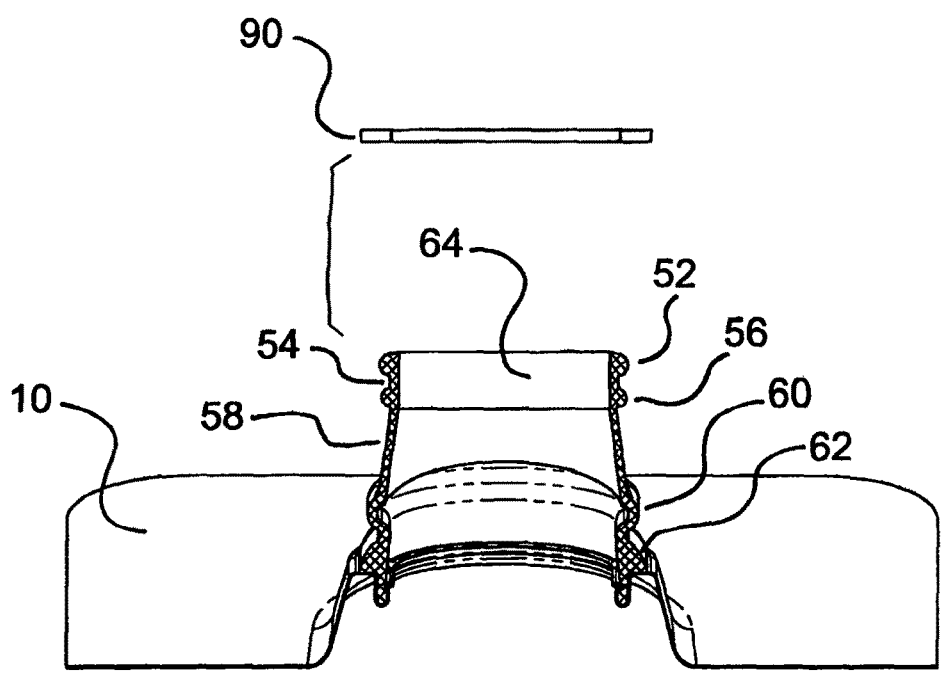
Figure 6-AA

Figure 8-A1

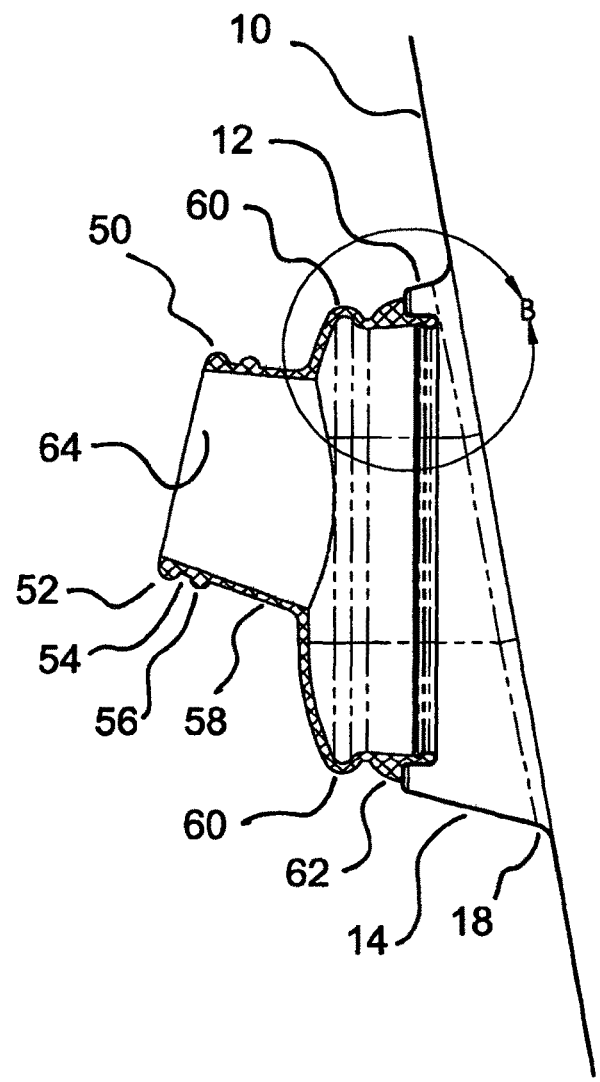
Figure 8-AA

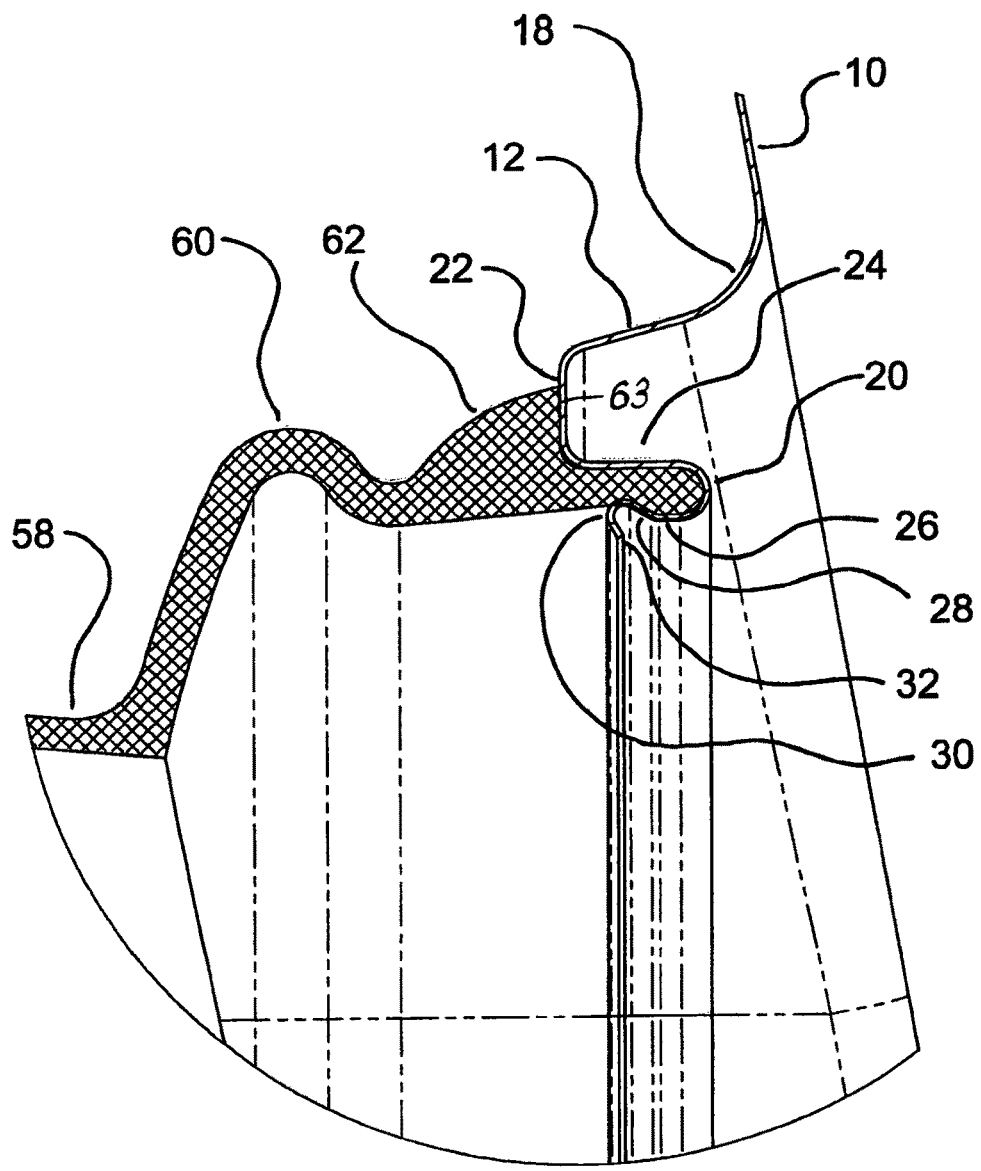
Figure 8-B

Figure 9-A1

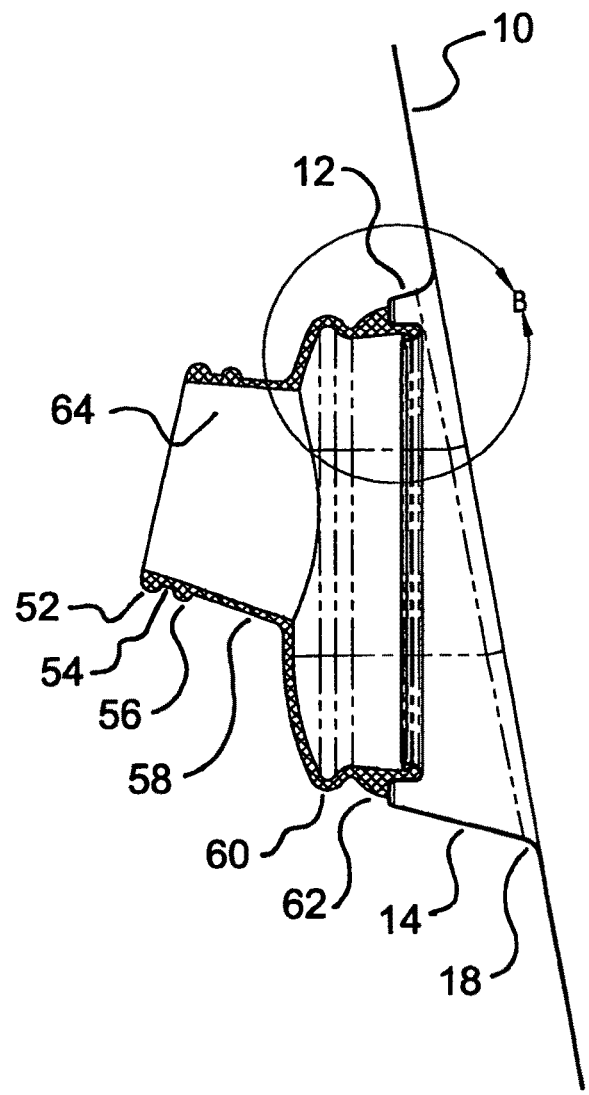
Figure 9-AA

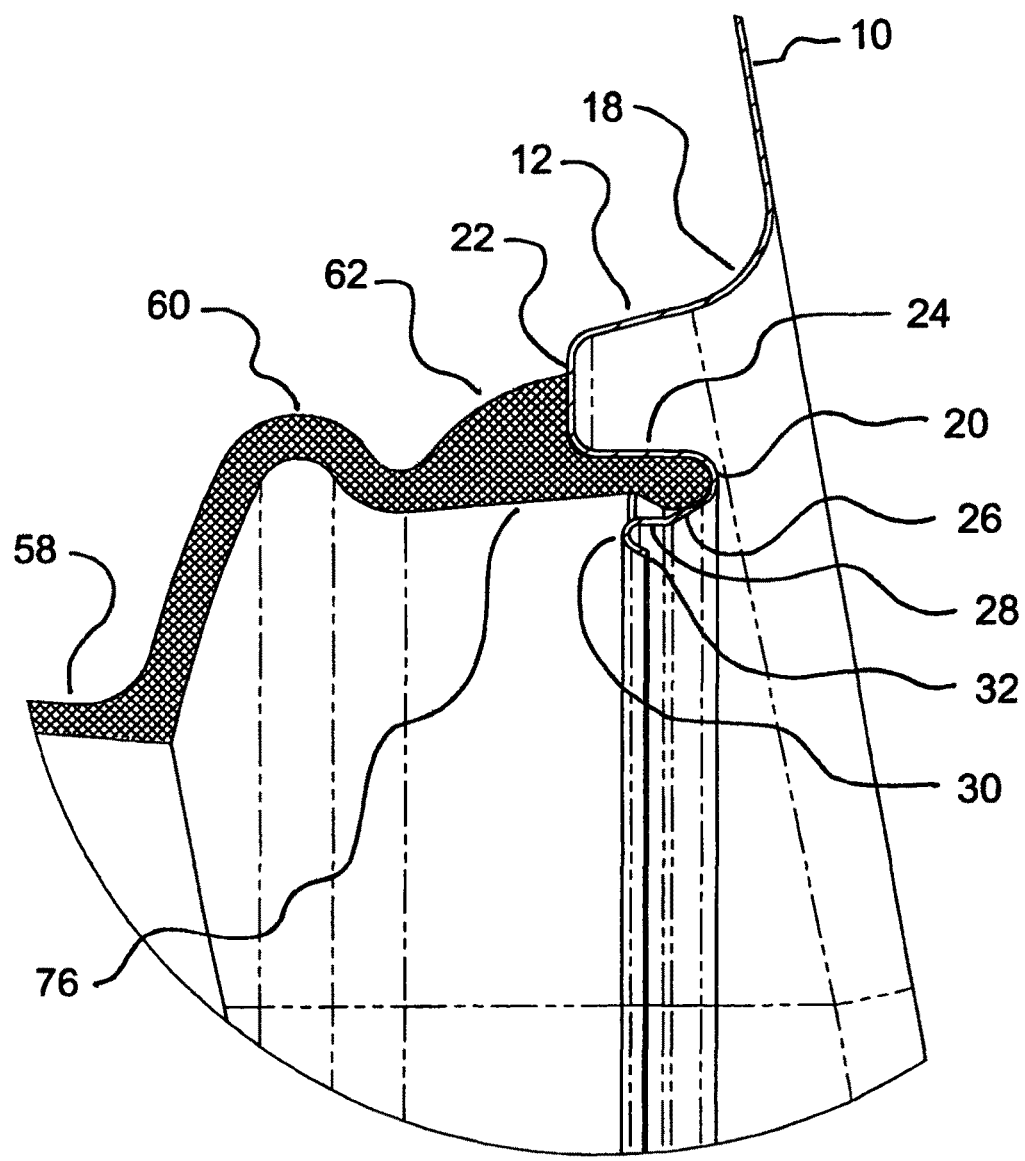
Figure 9-B

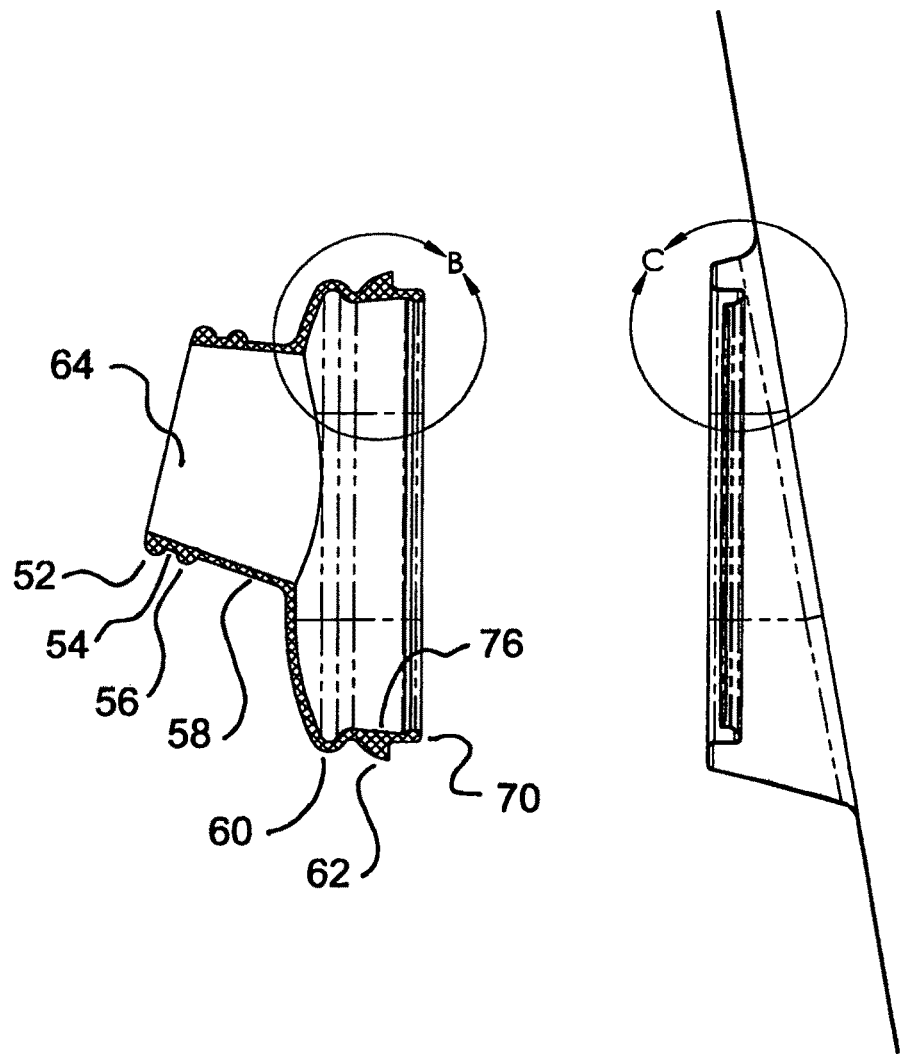
Figure 11-AA

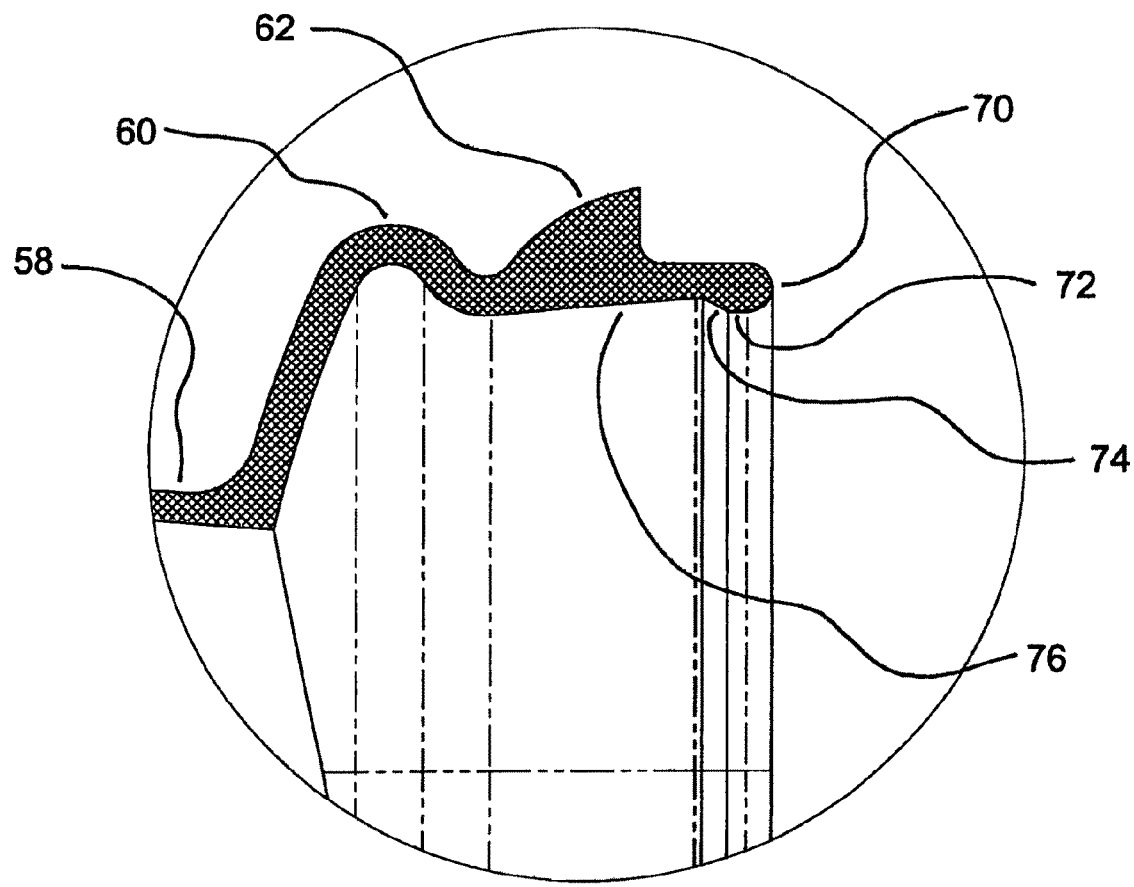
Figure 11-B

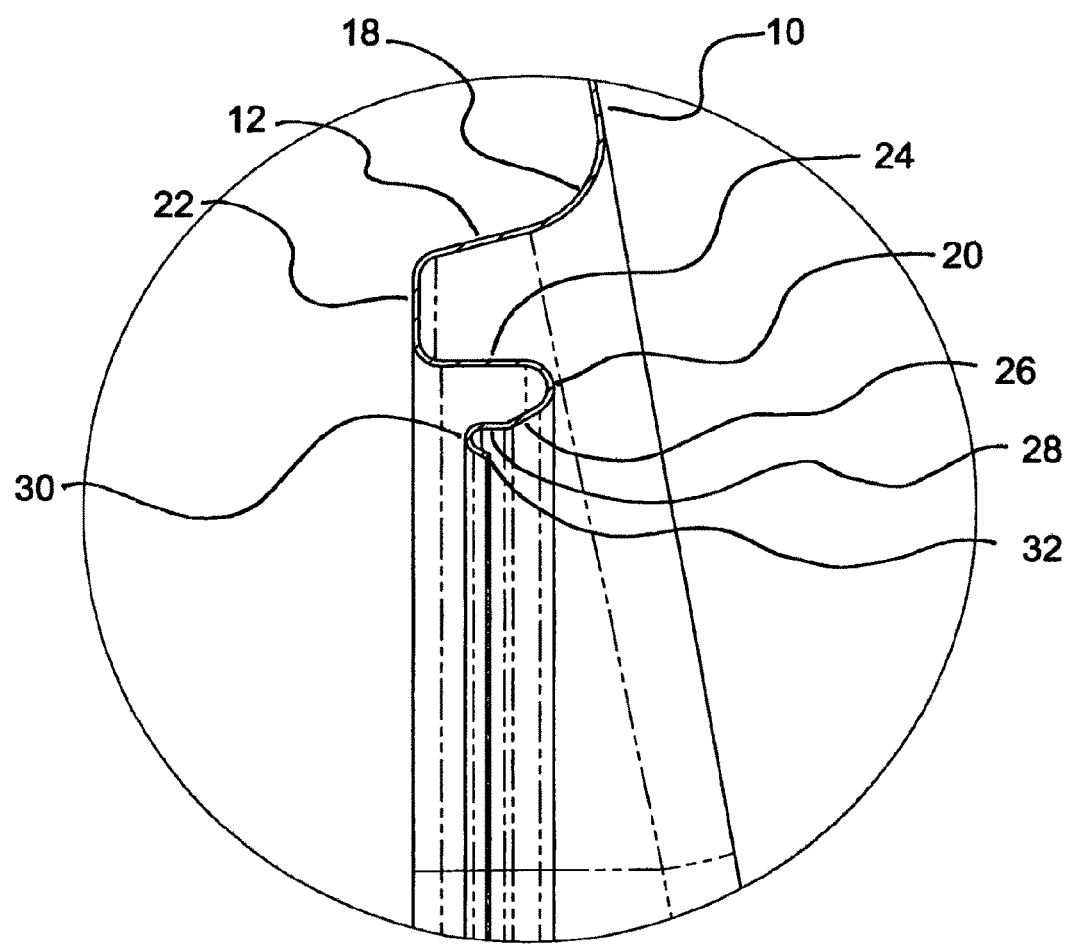
Figure 11-C

SEALING SYSTEM

BACKGROUND OF THE INVENTION

This application claims the benefit of U.S. Provisional Application No. 61/269,098 filed Jun. 19, 2009, which is hereby incorporated by reference in its entirety as if fully set forth herein.

SUMMARY OF THE INVENTION

The invention provides long lasting tight elastomeric seals around objects.

The invention provides sealing against ingress of water along any cylindrical object and also sealing a long a pipe, cable, wire or other feature penetrating roof covering materials, such as legs or stanchions connected to a roof or rafters for supporting antennas, decks or other devices mounted atop buildings or other structures. The new system provides long-life sealing of roof and roof covering penetrations in a manner that is simple to install correctly, is durable and is reliable. The invention is useful for sealing all objects and for sealing objects penetrating sloped roof structures and roof covering materials, including overlapped shingles. The seal portion of the sealing apparatus is usable independently from the remainder of the apparatus.

The invention provides a seal for pipes and penetrations of roof structures and coverings with a functional lifespan equal to or greater than the lifespan of the roof covering material. The new systems is easy to install, cost effective, durable and reliable for the intended application.

An object of the invention is to provide a long lasting elastomeric seal around an object.

An object of the present invention is to provide an apparatus, system and method for sealing roof penetrations or roof mountings, legs and stanchions that extend through roof coverings. The system provides long-life sealing solutions for the sealing of roof and roof covering penetrations. The present invention provides a simple apparatus for achieving this sealing solution in which installation is easy and intuitive to one skilled in the art. The new system is fabricated from materials that are durable and reliable in outdoor roof environments for prolonged life expectancy of the installed seal apparatus.

The new system resists snow and ice loading, and that prevents damage from snow and ice loading.

The invention is useful for all seal compressions and for all sloped roofs and shingle roof covering installations.

Plastic pipe of various diameters are routinely used in dwellings and other structures for plumbing system venting. In many instances this pipe must penetrate the roof to gain full and complete venting to the atmosphere outside of the dwelling or other structure. Sealing the roof penetration and preventing ingress of rain, condensate, insects and vermin has been a continual problem. The roof environment is hostile and is laden with issues that challenge the sealing apparatus or material. Some of the issues are: heavy exposure to sunlight and the thermal extremes caused thereby, non-protected exposure to the elements, heat differential between the exterior of the roof and the interior of the attic or roof substrate material, exposure to rain, snow and ice, and the weight of the snow and ice loads bearing downward as the snow and ice pack tries to slide down the roof.

Current apparatus used to provide this seal function are typically successful for some short period of time after installation. However, the seal apparatus will typically fail long before the roof covering material needs to be replaced. A failure of the seal apparatus will result in water ingress into the dwelling and water damage to the dwelling and its contents. Replacing the sealing apparatus requires skilled workmanship and is typically not an operation a non-skilled consumer or homeowner can perform alone.

Hence, there remains a need for an apparatus to seal the pipe penetration of a roof structure that will provide a useable lifespan greater than the lifespan of the roof covering materials to be used. An apparatus which is easy to install, cost effective and durable for the intended application is needed.

The invention includes a formed sheet base part inseparably assembled to a compression molded elastomeric member and including a separate rigid ring structure element. The inseparable assembly includes a forming operation that effectively crimps or permanently joins the base around a formed bead feature to retain and simultaneously compress the bead and to seal the two parts as one. The sheet may be metal or plastic.

The elastomer member allows for flexible and stretched installation, including two heavy cross-section ring elements that act as compression rings, squeezing the pipe exterior surface to facilitate compression seals at the pipe surface. The elastomer member is further shaped to allow for installation of the seal apparatus at varying angles to the pipe given the particular slope of the roof installation encountered. Further the elastomer member includes features for retaining a compression seal element that will compress the elastomer against the pipe in the selected area. This compression seal function is performed by a separate part; a rigid ring structure—ideally manufactured from a material with a similar thermal expansion coefficient to the pipe material. When installed, the inner diameter (ID) of the rigid ring and the outer diameter (OD) of the pipe define an annular space that is occupied by the trapped and compressed elastomer portion of the elastomer member. The annular space is slightly smaller than the cross-section of the elastomer in this same space leading to a compressed condition providing the seal between the elastomer member and the pipe exterior surface. The heavy cross-section ring features on the elastomer member serve to position and retain the rigid ring structure part before installation and then once installed over the pipe serve to prevent removal of the rigid ring structure from the seal apparatus.

This triple-seal—two stretch-compression ring seals surrounding a compression seal—to the pipe surface exceeds any sealing system currently in use for similar situations. The rigid seal ring compression far exceeds the anticipated use of a pipe clamp type of seal and will far out-live any externally applied adjustable or spring-loaded means of applying the compressive force. The linear surface area covered by this triple seal far exceeds the area in compression for any current device in the field and allows for repetitive axial pipe motion due to thermal variances on a daily basis. Current products will consistently move down the pipe with repetitive axial pipe motions and eventually fail and leak.

The seal apparatus assembly is used in the field as follows: given a roof structure with a pipe penetration; and in preparation for applying the roof covering material, slates, tiles or shingles, the installer will begin applying shingles or other materials from the bottom edge of the roof surface working row by row towards the top of the roof. During the application of the rows the installer will come to a position near to the pipe penetration. The installer will apply single rows until the row that is interrupted by the pipe penetration. The installer will then apply the seal apparatus by first setting the rigid ring structure into position and then by installing the seal apparatus over the top of the pipe and sliding the apparatus down the pipe until the flange of the sheet metal part rests firmly over the last row of shingles and the top most portion of the sheet metal part flange rests firmly on the roof substrate. The installer then affixes the top edge and upper sides of the seal apparatus to the roof substrate and then commences to finish installing shingles row by row—covering the flange portion of the sheet metal transition part in the process.

These and further and other objects and features of the invention are apparent in the disclosure, which includes the above and ongoing written specification, with the claims and the drawings.

BRIEF DESCRIPTION OF THE DRAWINGS

FIG. 3-AA is a section view, as directed from FIG. 3, showing the seal apparatus as installed upon the roof substrate;

FIG. 3-B is an enlarged detail view, as directed from FIG. 3-AA, showing the seal apparatus as installed on a roof substrate;

FIG. 5-AA is a section view, as directed from FIG. 5, of the sealing apparatus;

FIG. 6-AA is a section view, as directed from FIG. 6, of the sealing apparatus.

FIG. 8-A1 is a plan view of the inseparable assembly portion of the sealing apparatus;

FIG. 8-AA is a section view, as directed from FIG. 8-A1, of the inseparable assembly portion of the sealing apparatus—in detail showing the inseparable assembly operation in the completed condition;

FIG. 8-B is an enlarged detail view, as directed from FIG. 8-AA, showing the formed inseparable assembly operation in the completed condition;

FIG. 9-A1 is a plan view of the inseparable assembly portion of the sealing apparatus;

FIG. 9-AA is a section view, as directed from FIG. 9-A1, of the inseparable assembly portion of the sealing apparatus—in detail showing the inseparable assembly components prior to the crimp form operation;

FIG. 9-B is an enlarged detail view, as directed from FIG. 9-AA, showing the inseparable assembly features prior to the crimp form operation;

FIG. 11-AA is a section view, as directed from FIG. 11, shown exploded of the inseparable assembly portion of the sealing apparatus;

FIG. 11-B is an enlarged detail view, as directed from FIG. 11-AA, showing the detailed geometry of the elastomeric portion of the inseparable assembly; and, FIG. 11-C is an enlarged detailed view, as directed from FIG. 11-AA, showing the detailed geometry of the rigid base portion of the inseparable assembly.

DETAILED DESCRIPTION OF THE DRAWINGS

Figure 1:
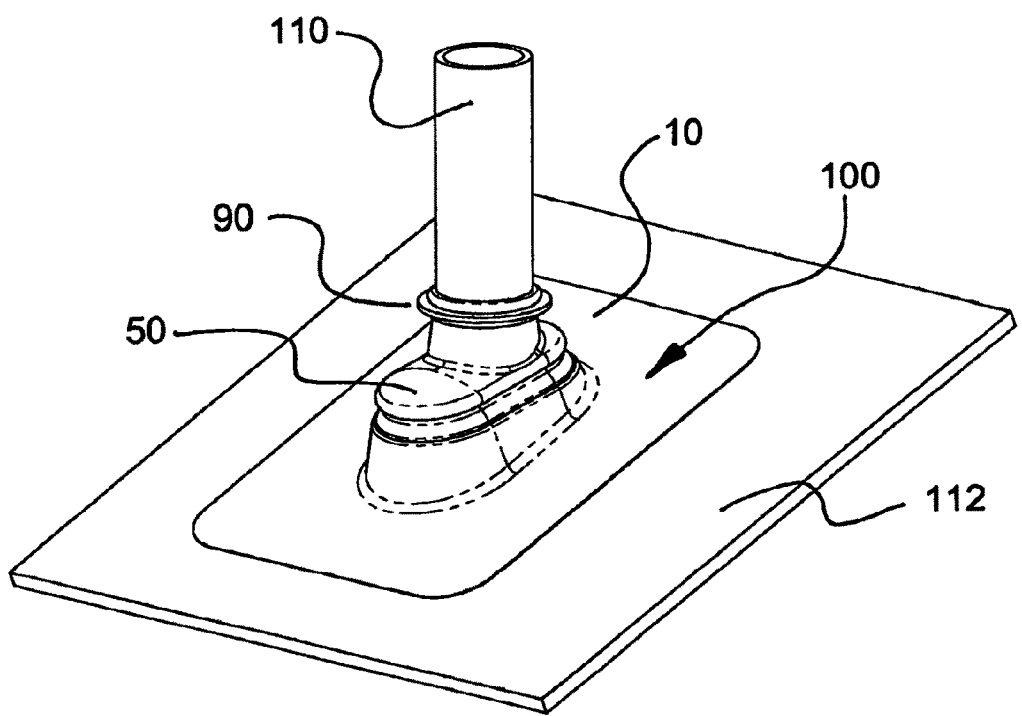
FIG. 1 is a perspective view of the sealing apparatus as installed upon a roof substrate, showing an essentially external view of the installed device.

The seals shown in the drawings are useful for long lasting elastomer seals around objects. The seals use a ring of the same material or a material having similar expansion and contraction characteristics as the material of the object that is engaged by an elastomeric material on which the ring is carried. Beads on the elastomeric material hold compression of the elastomeric seal against the object. The beads locate the ring on the seal.

In overall operation, the roof penetration sealing system of the present invention serves the crucial function of providing a long-term, durable and reliable seal between the roof penetrating element and the roof substrate and covering material. It safeguards the building and roof structure against the ingress of rainwater, condensate, snow, ice, airborne dust and dirt, insects, vermin and the like. The seal of the present invention combined with the method of installation provide a system for sealing the roof and penetrating element that can withstand the environmental and thermal-mechanical forces which create failures in other seals.

The roof seal apparatus has three main components. A rigid base plate element is the point of attachment to the roof substrate around the object to be sealed. A flexible transition member is affixed to the base plate element in an inseparable manner and provides the seal to the roof penetrating element. A compression element is positioned outside of the flexible transition element and is sized to constrain a uniform portion of the flexible transition element between the compression element and the roof penetrating object. The choice of materials to be used, the design of the interfaces between materials and the method of assembling the materials into the final seal apparatus, all combine to provide the unique attributes and performance of the new seal.

FIGS. 1-11 show an exemplary embodiment of a roof penetration sealing system 100 for a long term, durable and reliable seal. The new system is shown in FIG. 1 sealing a plastic plumbing vent pipe 110 that penetrates through a roof substrate 112. The sloped roof 112 will be covered with an overlapping shingle roof covering material. This is but one of numerous embodiments in which the sealing system 100 may be realized in accordance with the present invention.

FIG. 1 shows the plate 10, the boot 50 that is inseparably connected to the plate 10, and the compression ring 90.

Figure 2:
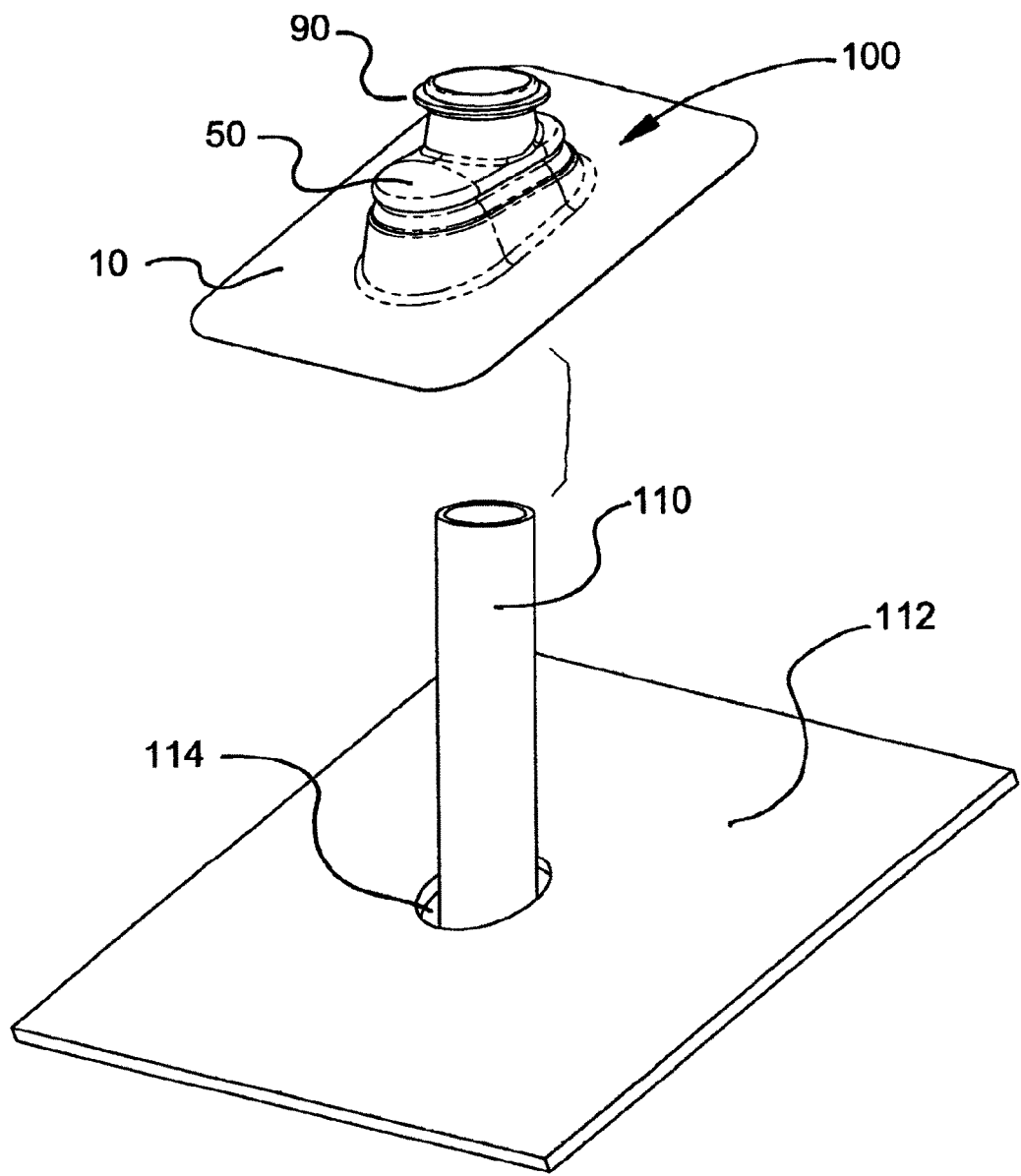
FIG. 2 is an exploded perspective view showing the sealing apparatus in a position ready to be installed onto a pipe as it is situated penetrating a roof substrate.

The sealing system 100 has three main system components: the rigid base plate 10; the flexible transition element 50; and, the rigid compression element 90. Referring to FIG. 2, roof penetrating pipe 110 extends thorough a hole 114 in the roof substrate 112. The sealing system 100 is installed over the pipe 110 and pushed down onto roof substrate 112. The geometric and elastomeric properties of flexible seal element 50 allows the sealing system 100 to be applied to roof structures of varying pitch from a flat roof to a steeply sloped roof.

Figure 3:
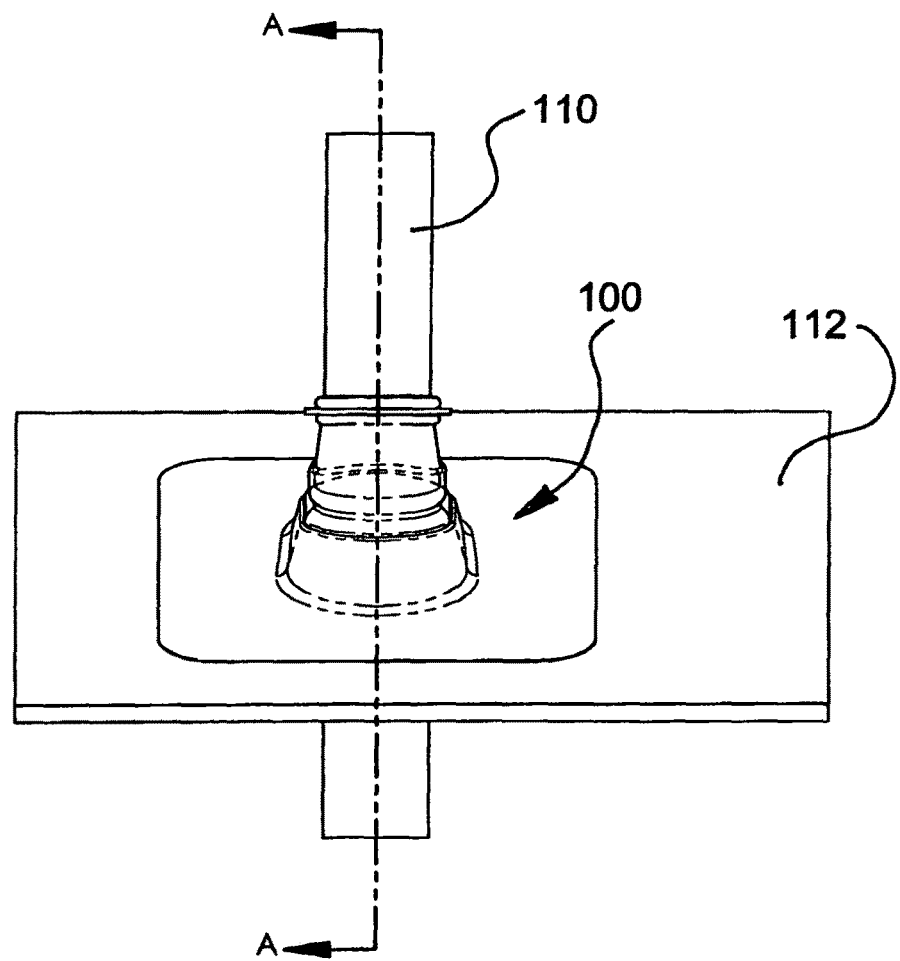
FIG. 3 is a front elevation view of the seal apparatus as installed upon a roof substrate.

In FIGS. 3 and 3-B, as enlarged from FIG. 3-AA, the sealing apparatus 100 is shown as installed over pipe 110. Flexible transition element 50 is shown after the upper seal part 51 has been stretched and installed over pipe 110. As manufactured, the upper seal portion 51 of flexible transition element 50 is formed slightly smaller than the corresponding anticipated pipe element 110 outside diameter, such that the seal portion 51 of the flexible transition element must stretch some small percentage as it is installed. Flexible transition element 50 is manufactured from a resilient elastomeric material such as silicone and is manufactured using a compression molding process that insures homogenous material properties throughout the molded part. The upper seal portion 51 of the flexible transition element 50 has two heavy cross-section features, an upper stretch bead 52 and lower stretch bead 56. The larger cross-section of resilient material provides a higher stretch and squeeze force on the pipe element 110. Further, having additional material in these areas permits surface degradation of the material over time without adversely affecting the seal integrity. A uniform thickness wall portion 54 separates the two stretch beads 52 and 56. Compression element 90 is held between the two stretch beads 52 and 56 directly in the gap provided by the uniform wall portion 54. The internal diameter of compression element 90 is sized precisely to restrain expansion of the middle part 54 of the sealing portion 51 of the flexible transition element 50 as it is installed over the pipe 110. In effect, as the flexible transition element 50 is installed over the pipe 110, the inner surface 64 of the sealing portion 51 of the elastomeric material stretches to fit the pipe 110 outside diameter and the effective outside diameter in the stretched area of flexible transition element seal portion 51 grows to a larger outer diameter. This outer diameter growth is not linear due to the reduction in cross-section caused by the stretching of the material. This new larger effective outer diameter of the seal portion of the flexible transition element 50 is restrained by compression element 90, whose internal diameter is slightly smaller than the larger effective outer diameter in the uniform wall portion 54, thereby creating a compressive force or squeeze, on the flexible transition element 50 in the uniform wall portion 54. The compression element is formed of a material with similar mechanical properties to the pipe 110. The material used in the compression element 90 exhibits a similar coefficient of thermal expansion as the pipe 110. As the pipe 110 is changing dimension due to thermal changes, the compression element 90 experiences the same thermal changes and changes dimension in a similar magnitude and at a similar rate as the pipe. In matching the thermal coefficient of expansion for both parts, the pipe 110 and the element 90, applying the squeeze or compressive forces to the flexible transition element 50, the magnitude of the compressive stress within the resilient material stays as uniform as possible throughout thermal gradients which occur on a daily cycle. In addition, compression element 90 serves to fully shield uniform wall portion 54 from all sunlight UV exposure and from the elements. Lower stretch bead 56 is also partially protected from sunlight UV exposure and atmospheric elements by compression element 90. The outside diameter and geometry of compression element 90 is determined such that it provides adequate resistance to the compressive resultant forces from the flexible transition element 50 but is not so large diameter that it could become a damaging element under a snow or ice load. The best embodiment for compression element 90 is as shown a single piece formed ring like structure; ideally manufactured from an injection molding grade of thermoplastic, more specifically polyvinylchloride or PVC.

It can be appreciated that any means could be used to provide this radial compression to the uniform wall portion 54 of the flexible transition element 50. Certainly commercially available hose clamps, adjustable and spring loaded clamps, and the like could be employed in this function. However, due to the notch sensitivity of the elastomeric materials ideally suited for this intended application, most commercially available clamp products would cause premature failure of the system. By manufacturing the compression element 90 to a fixed size and by careful control of the materials, the part dimensions and the manufacturing process, the resultant compression interface can be free of notch inducing features; thereby removing one failure mode and further insuring the durability and longevity of the sealing apparatus and system.

Figure 4:
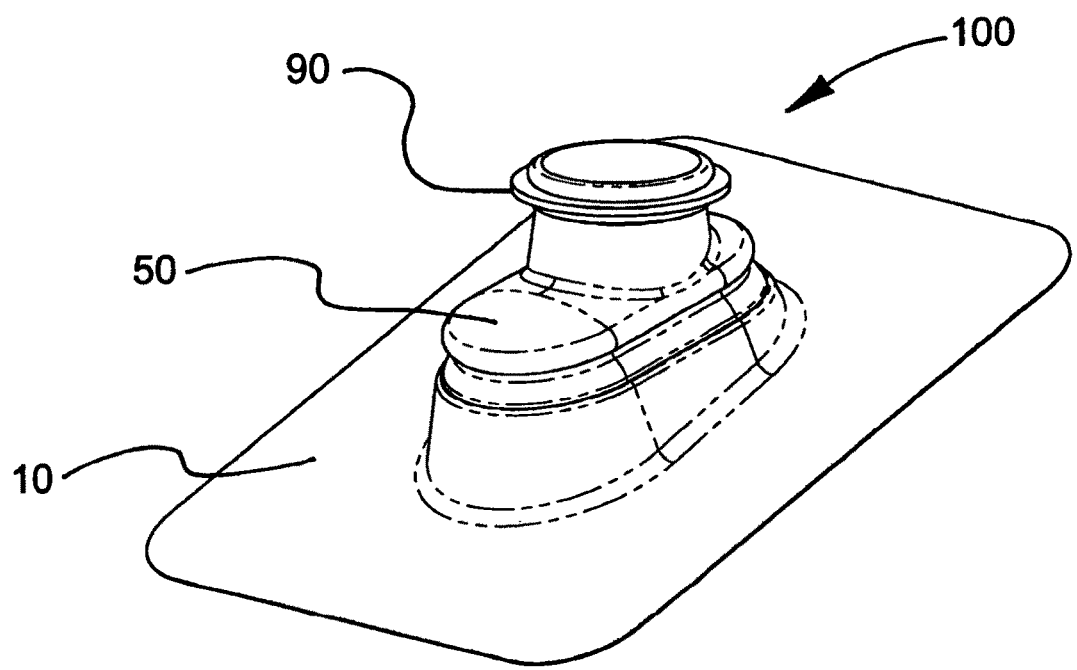
FIG. 4 is a perspective view of the seal Apparatus.
Figure 5:
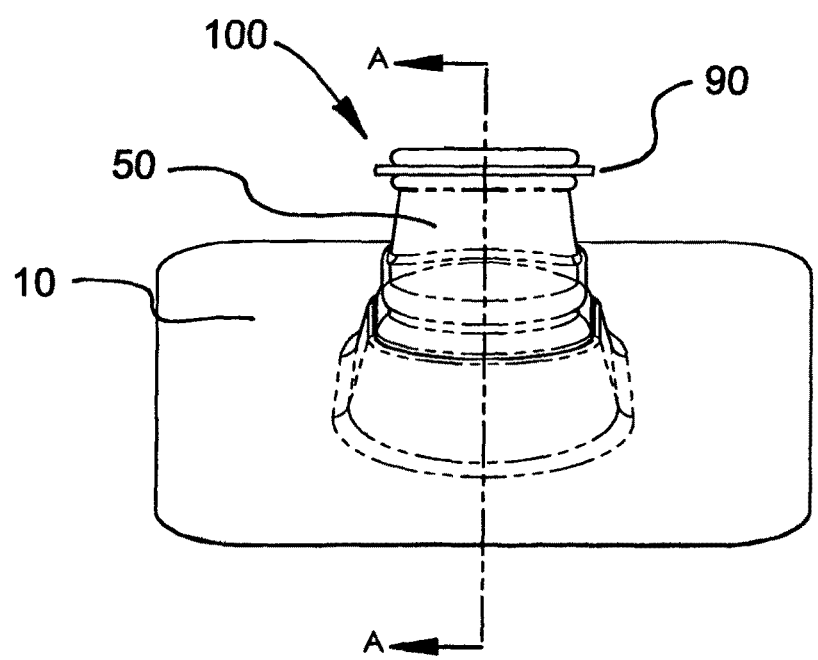
FIG. 5 is a front elevation view of the seal apparatus.
Figure 6:
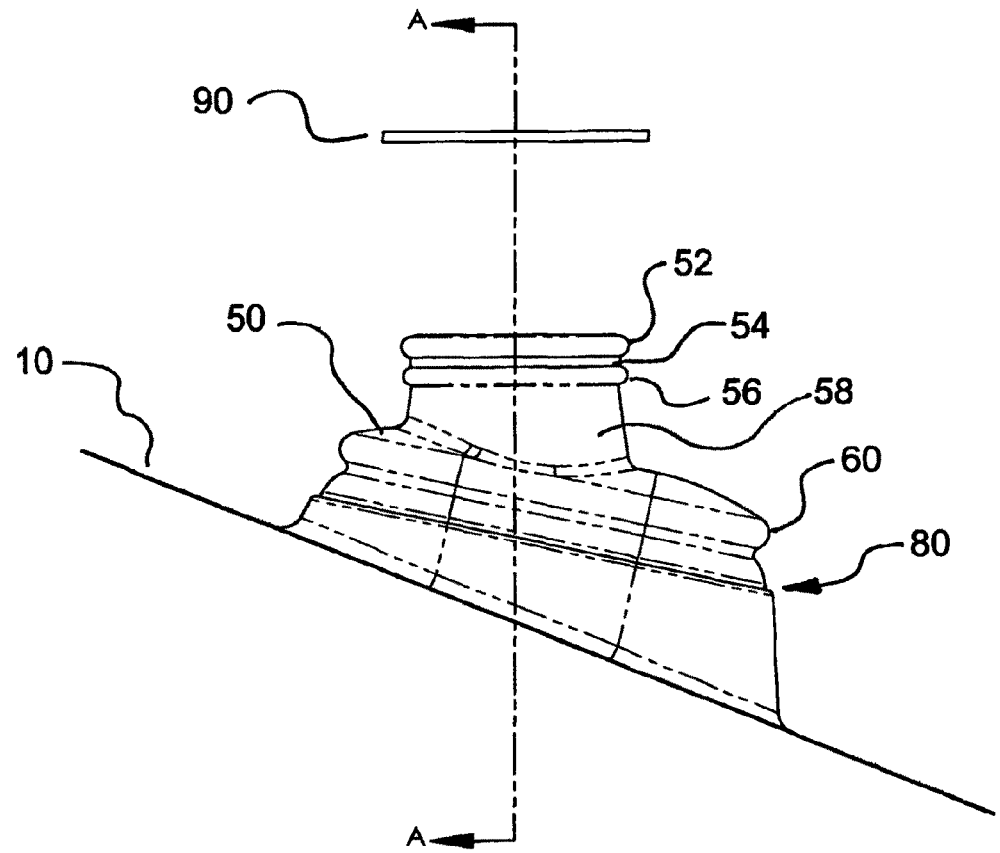
FIG. 6 is a partially exploded side elevation view of the sealing apparatus.
Figure 7:
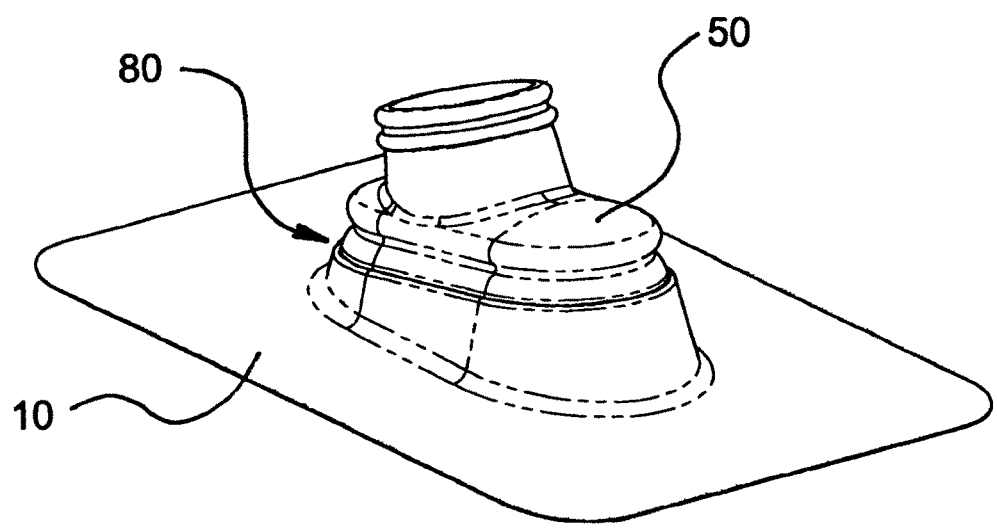
FIG. 7 is a perspective view of the inseparable assembly portion of the sealing apparatus.
Figure 8:
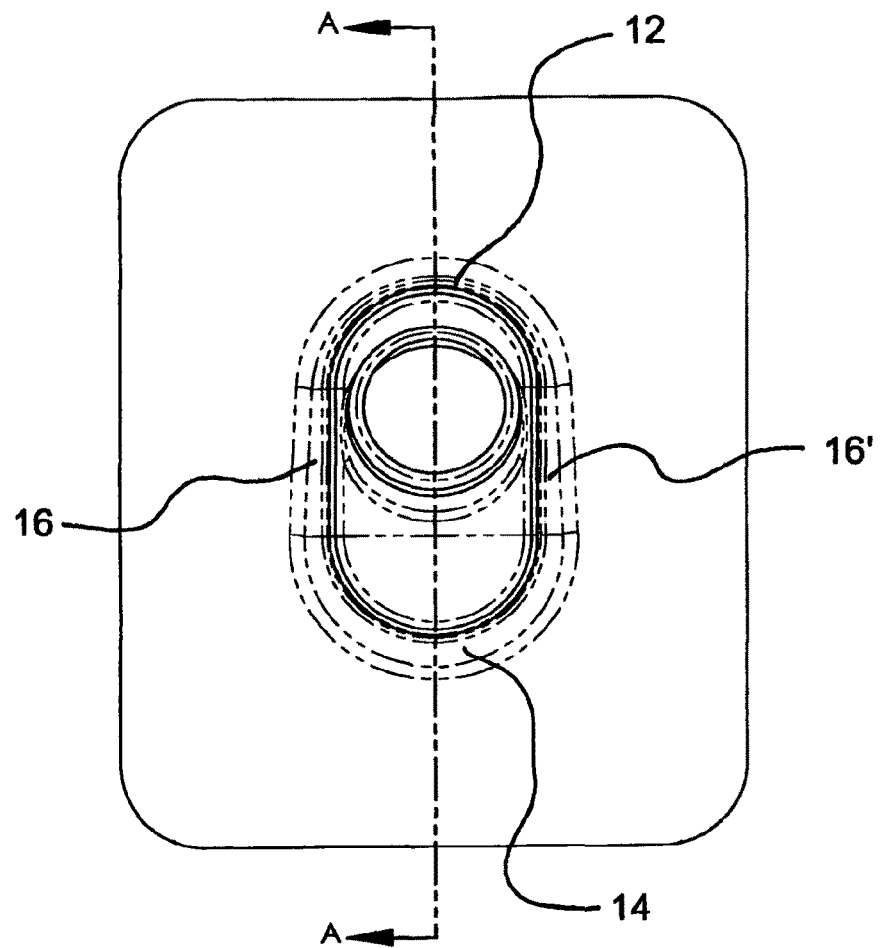
FIG. 8 is a front elevation view of the inseparable assembly portion of the sealing apparatus.
Figure 8:
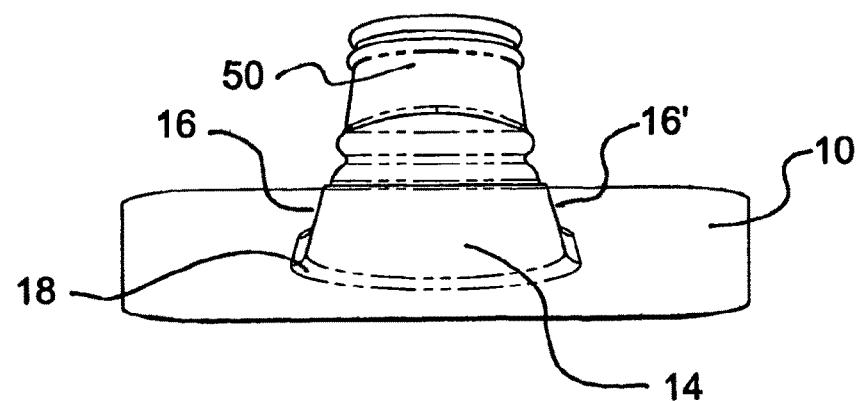

FIGS. 4 and 5 show the sealing apparatus 100 as it is manufactured and shipped to the roof contractor or distributor. The apparatus is shown as an assembly 100 alone, not installed on any roof substrate or over any roof penetrating element. The flexible transition element 50, as formed from an elastomeric resilient material is permanently affixed to base plate 10, forming inseparable assembly 80. In addition to the upper sealing position with the two stretch beads 52 and 56 formed integrally into the flexible transition element 50 there is an upper tapered wall portion 58, a lower bulbous portion 60, and a heavy-wall section seat portion 62. All are formed as an integral part of the flexible transition element 50. The lower bead 70 of the flexible transition element 50 has been crimped or rolled into a groove at the top of the upward extension of plate 10, and the expansion restrictor 90 has been installed between the beads 52 and 52.

In FIGS. 6 through 9, the inseparable subassembly 80 is shown in the assembled state. Base plate 10 is die or roller formed of a rigid material capable of both being permanently affixed to the flexible transition element 50 and capable of being integrated under and within a roof covering material with ease. A galvanized and coated steel sheet and suitable alloys and plastic materials exist that would function well for this part. The base plate 10 is formed to accommodate the assembly to the flexible transition element 50 and formed to facilitate and at least partially accommodate variations in roof structure pitch that are encountered at installation. As formed in an oval geometry, there is a shorter tapered wall 12, a longer tapered wall 14 and two adjacent tapered side walls 16 and 16'. All walls meet the plane of the base plate 10 at radius 18, and all walls meet at upper oval surface 22. The portion of base plate 10 responsible for the permanent assembly to the lower bead 70 of the flexible transition element 50 is shown in enlarged detail in FIG. 8-B. The inseparable assembly 80 is shown in its finished state. Base plate 10 has an upper ledge portion 22 formed to match and mate with the ledge 63 on the underside of the heavy-wall section portion 62 of the flexible transition element 50. Some installations, such as those with particularly harsh environmental extremes, may require an added level of protection and as such an adhesive, bond, sealant, caulk compound or the like can be applied between top surface 22 and the underside 63 of heavy-wall section 62. The oval surface comprised of the sloped walls 12, 14, 16 and 16' is larger than the corresponding heavy-wall section portion 62 leaving a small portion of top surface 22 exposed. This slight set-back of the elastomer portion from the rigid base plate helps to prevent separation of the flexible transition element 50 from the base plate 10 due to ice intrusion. On the base plate 10 an internal vertical wall 24 is formed, followed by integral radius 20 and walls 26 and 28, ending in return curve 30. The walls are shown in the closed position, trapping some volume of material on the flexible transition element 50. This internal "U" shaped channel 21 runs around the internal perimeter of the base plate 10, such that when walls 26 and 28 are in the closed position there exists a compression seal running the entire perimeter of the joint between base plate 10 and flexible transition element 50. This compression seal is achieved by deforming walls 26 and 28 inward against the walls 72 and 74 of the flexible transition element 50. The bead of elastomeric material comprised of walls 72 and 74 and the end radius 70 gets trapped and squeezed between wall 24 and walls 26 and 28 as walls 26 and 28 are crimped or rolled and deformed into bead-capturing position. For a base plate 10 made from a steel or other metal alloy this forming operation is commonly called a crimp or sizing operation moving the metal feature past its elastic limit to form a permanent new feature. Should the base plate be made from a plastic or other non-ferrous material, a heat operation can be utilized to form the material and then re-freeze the material to a new permanent shape.

In another embodiment, the flexible transition element 50 could be formed to the base plate 10 as part of the molding process, commonly known as over-molding, two shot or insert-molding. In this embodiment, no crimp or form operation would be required. The moldable resilient material used for the flexible transition element would be molded directly to the base plate part 10, requiring no further assembly processes to create the inseparable assembly.

Figure 9:
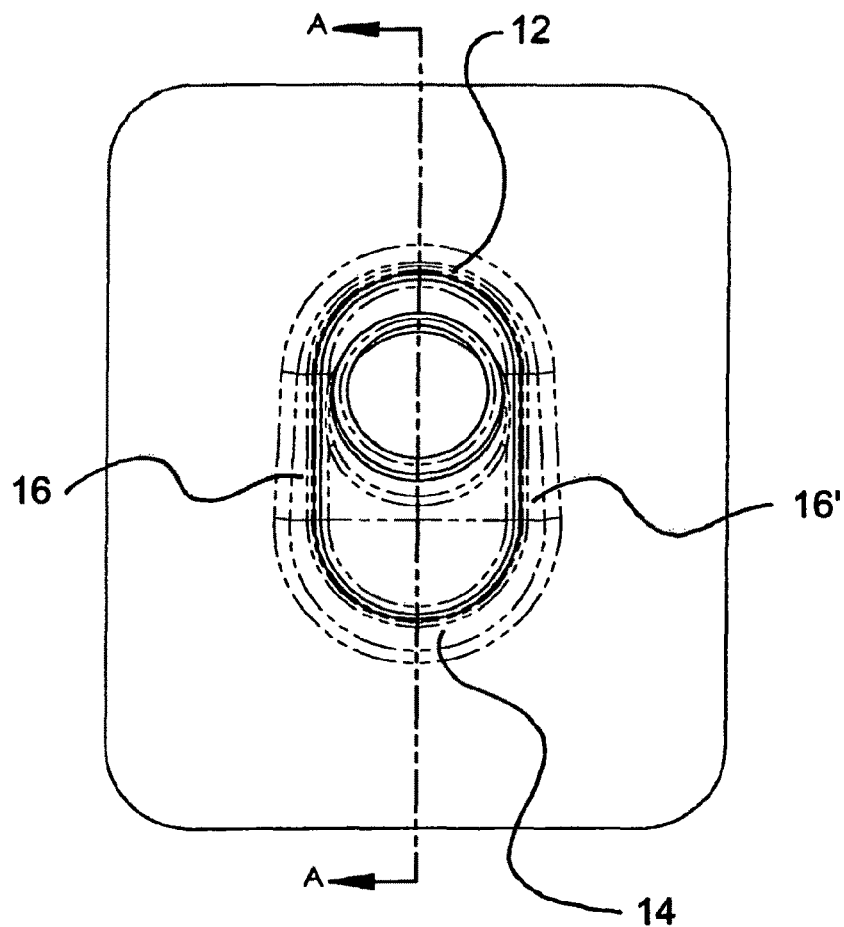
FIG. 9 is a front elevation view of the inseparable assembly portion of the sealing apparatus.
Figure 9:
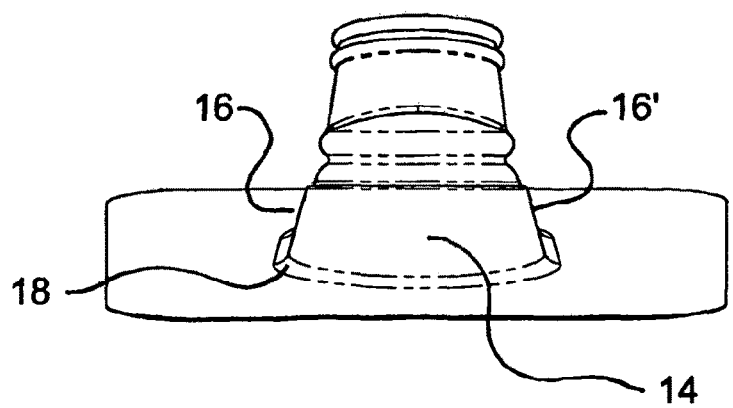
Figure 10:
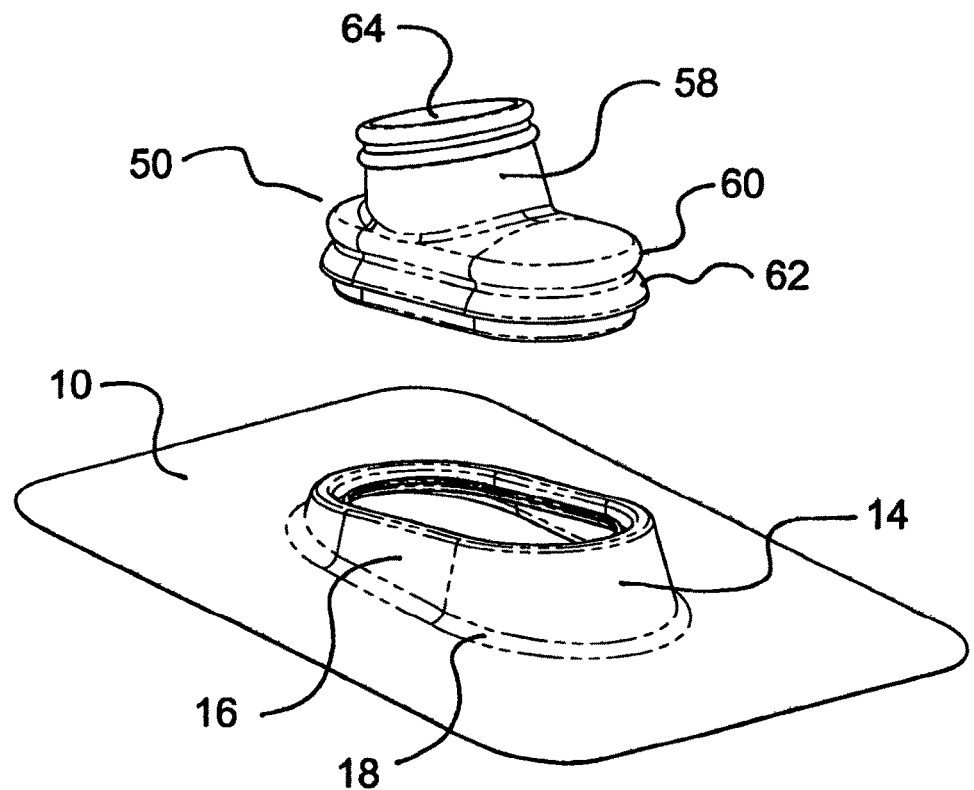
FIG. 10 is an exploded view of the inseparable assembly portion of the sealing apparatus.
Figure 11:
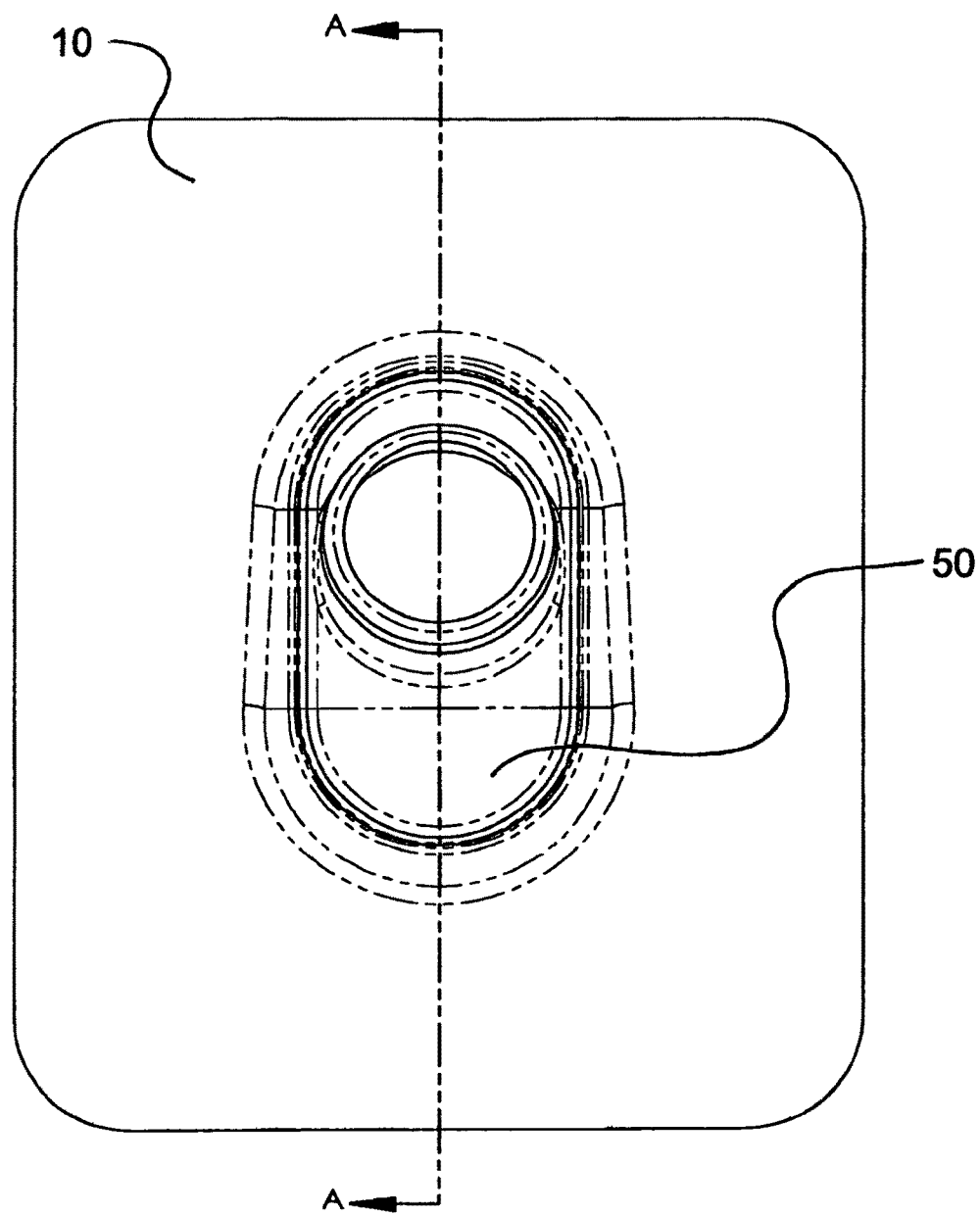
FIG. 11 is a plan view of the sealing apparatus.
Figure 13:
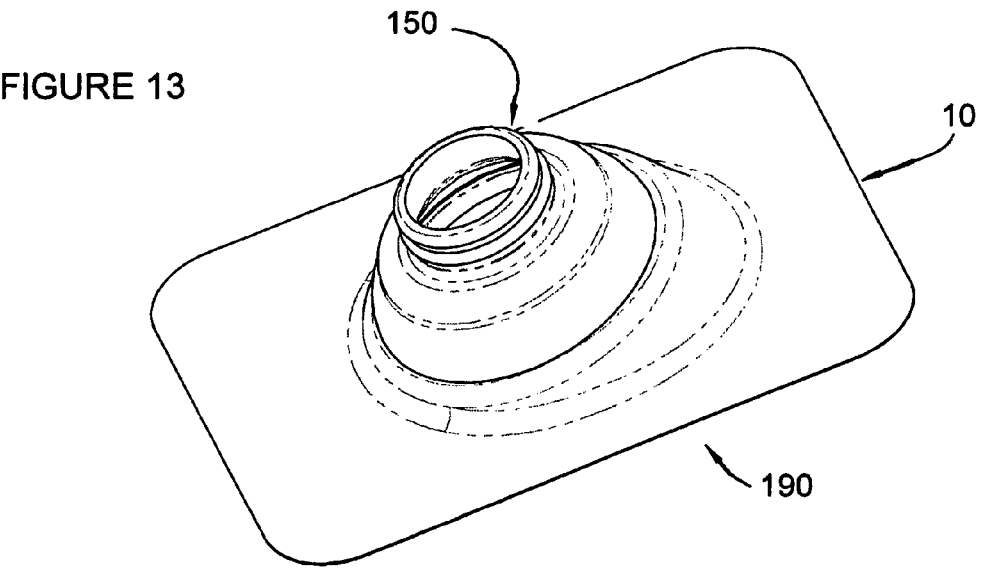
FIG. 13 is a perspective, side and top view of the plate and sleeve subassembly.
Figure 12:
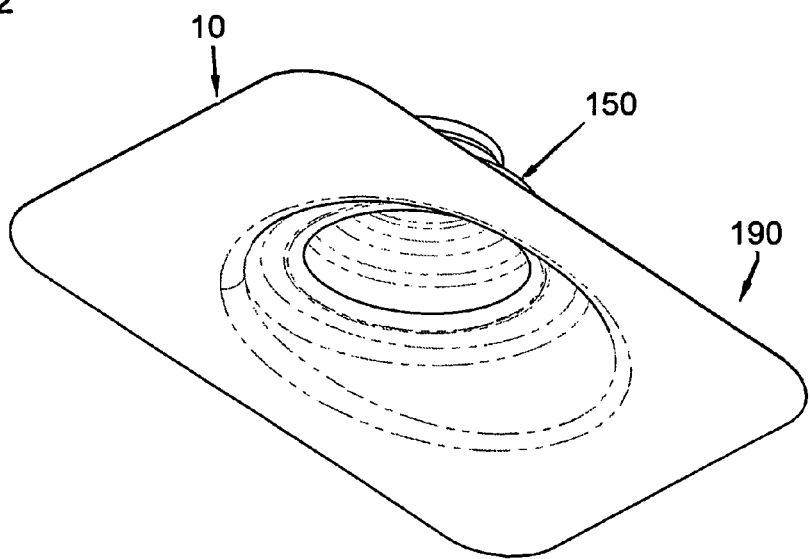
FIG. 12 is a perspective view of a plate and sleeve subassembly.
Figure 15:
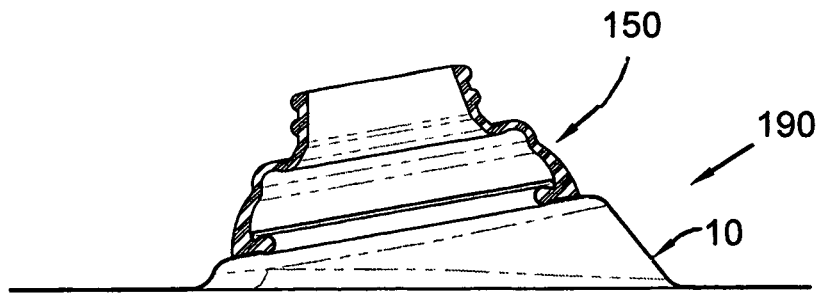
FIG. 15 is a side view section of the plate and sleeve assembly shown in FIGS. 1-3.
Figure 14:
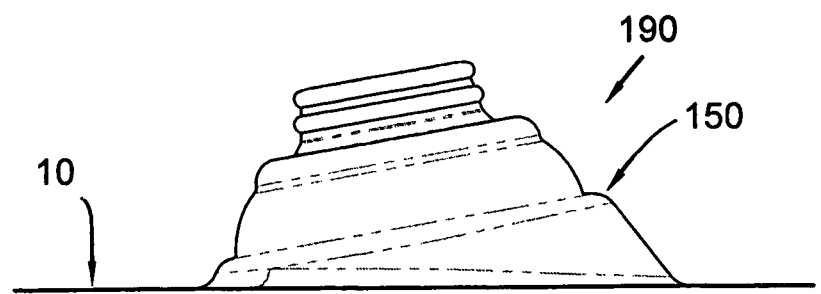
FIG. 14 is a perspective side view of the plate and sleeve subassembly.
Figure 17:
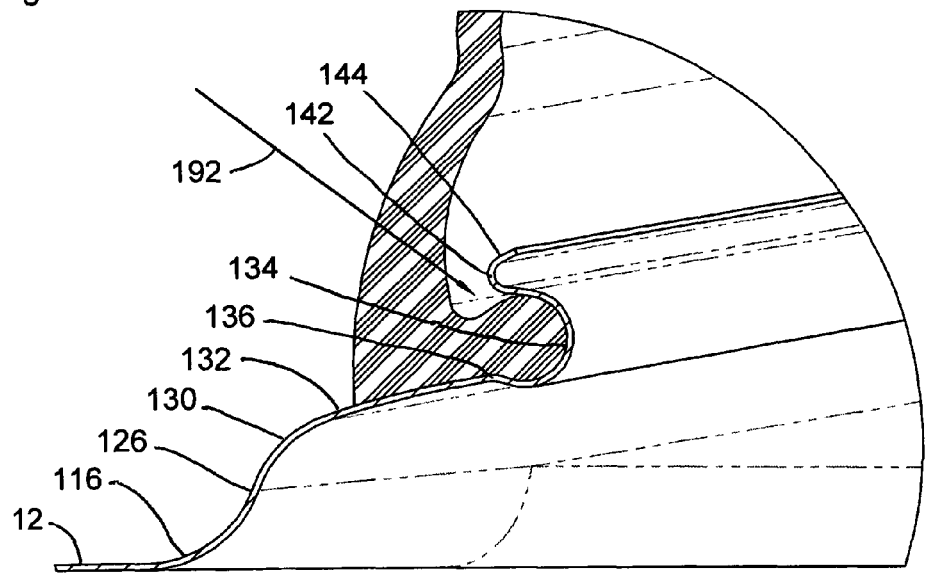
FIGS. 16 and 17 are enlarged side view section details of the plate and sleeve subassembly shown in FIGS. 12-15 before crimping inner edges of the plate around an inner bead of the sleeve.
Figure 16:
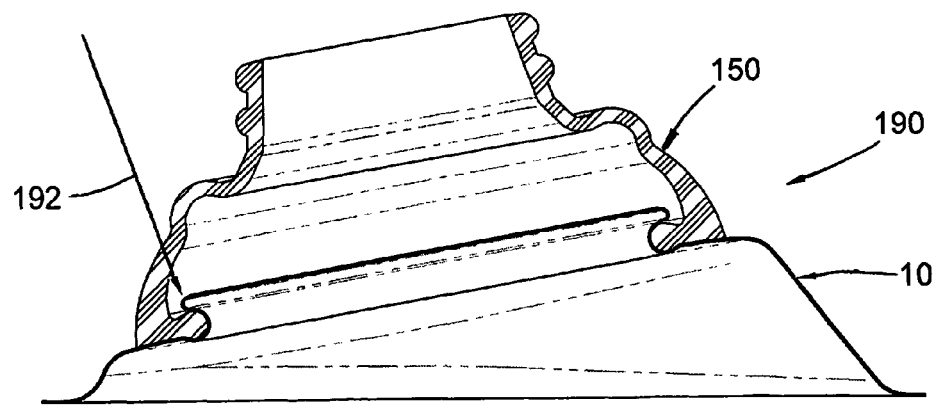
Figure 19:
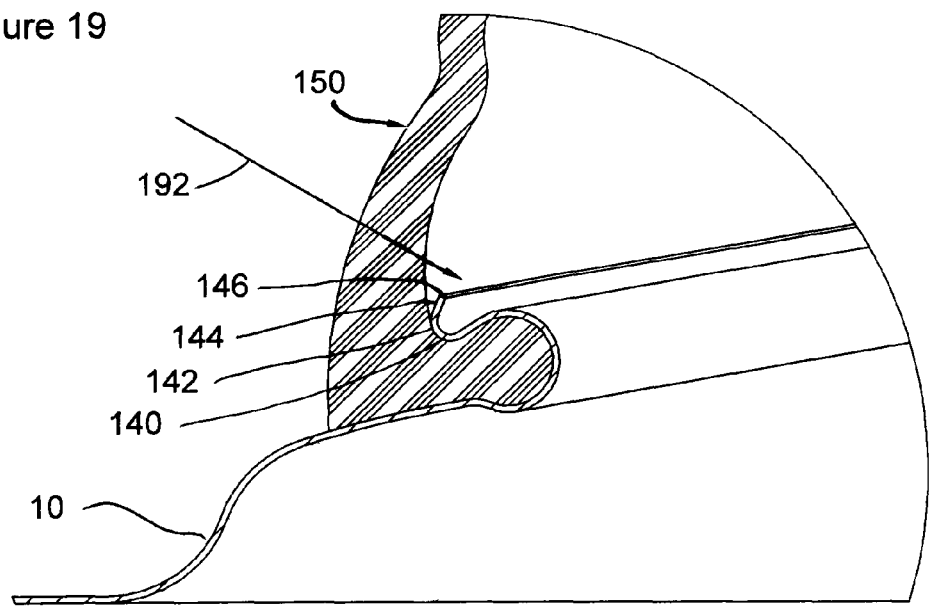
FIGS. 18 and 19 are enlarged side view section details of the plate and sleeve subassembly shown in FIGS. 12-17 after crimping inner edges of the plate around an inner bead of the sleeve.
Figure 18:
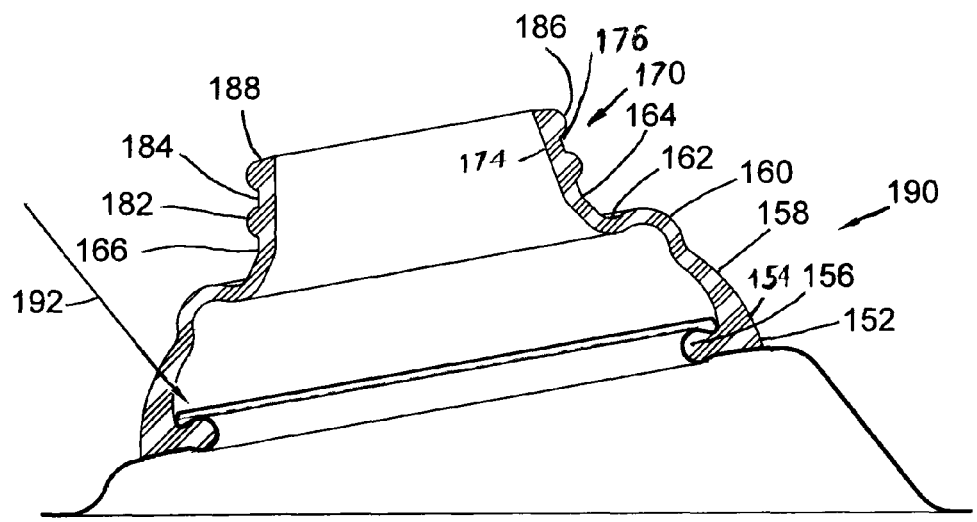

Referring to FIGS. 9 through 11, the inseparable assembly 80 is shown in the un-assembled condition, prior to the deforming or crimping operation to make it into a fixed permanent assembly. FIGS. 9-B and 11-C show the base plate 10 in the pre-crimp operation condition; walls 26 and 28 and radius 30 are all shown in the opened condition. Flexible transition element 50 bead feature 70 is shown as inserted into the "U" shaped well 21 ready for the forming operation to close walls 26 and 28. Note the geometry of the plate radius feature 30 is situated such that at no time could its raw edge 32 ever come into contact with the inner wall 76 of flexible transition element 50. That further insures prolonged life of the installed seal apparatus.

To facilitate installation on a pipe and to help insure longevity of the flexible transition element 50 a lubricant may be added to the inner surface 64 of the sealing portion prior to installation onto the pipe 110. This lubricant may be added to the system in the factory as part of the manufacturing process or it may be added in the field just prior to installation. An internal groove in surface 64 or an additional removable sheet or permanent slidable piece may assist in retaining the lubricant until time of use. This lubricant will help during installation over the pipe and along the surface of the pipe as the sealing assembly is slid down to seat the plate on the roof substrate surface.

FIGS. 12-19 are perspective views and details of an inverted die-formed metal base plate 10 and a molded silicone elastomer sealing part 150 joined together in a subassembly 190. The base part 10 has a rectangular flat base 12 with an oval center portion 14 which is radiused 116 when pressed outward from the flat base 12.

The oval center portion 14 has long opposite curved and inward sloped sides 116 extending between a larger, curved inward sloping lower end wall 124 and a shorter, curved inward sloping upper wall 126.

The inward sloping side walls 116 and end walls 124, 126 are radiused outwardly and terminate in a circular section 130. The circular section 130 has an inward extending sloping planar shelf 132. An inwardly extending bulbous receiver 134 having a convex wall 136 with a partially spherical shape terminates in a re-entrantly curved section 140 with an outward extending curve 142 and an inwardly extending ledge 144 and edge 146.

The silicone elastomer sealing part 150 is generally formed with radiused sections around a central axis. The bottom end 152 is relatively thick as compared to the more flexible upper walls. An inwardly and slightly upwardly sloped bottom inward extension 154 terminates inwardly in a bulbous bead 156.

The side walls 158 are curved and tapered inward and upward to a large radiused transition middle portion shoulder 160 of uniform thickness. A smaller radius 162 on an inward end of the larger radiused shoulder 160 connects to an inward and upward sloping wall 164. The latter wall 164 is connected by a small radius 166 to an upper part 170, which is relatively thicker than the radiused shoulder 160.

The upper portion 170 has an inward and upward sloping wall 172, the inner surface 174 of which is stretched over and engaged an outer cylindrical surface of a pipe extending through a roof.

The outer surface 176 of the sloping wall 172 is formed with two parallel outward extending integral half O-ring bead sections 182 and 186 spaced below and above an intermediate section 184. The upper end 188 has a flat surface which is radiused into the upper half O-ring bead section 186.

The subassembly 190 is completed as shown with the arrows 192 in FIGS. 16-19 by placing a crimping tool in the curve 142 and crimping the receiver 134 into a circular cross section around the bulbous bead 156 on the silicone elastomer seal part. Curve 142 spaces the ledge 144 and edge 148 inward, away from contact with the silicone elastomer member 150, during and after the crimping.

Figure 33:
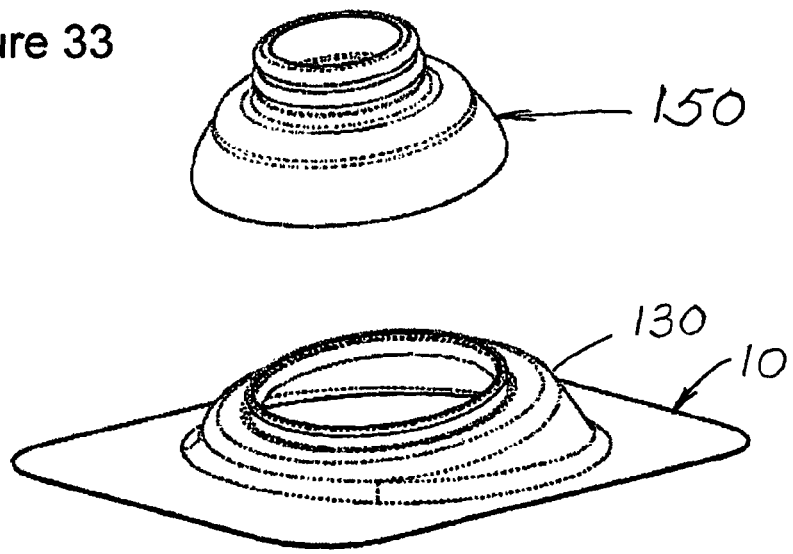
FIG. 33 is an exploded top and side perspective view of the metal base and silicone elastomer sealing part before they are assembled together.
Figure 34:
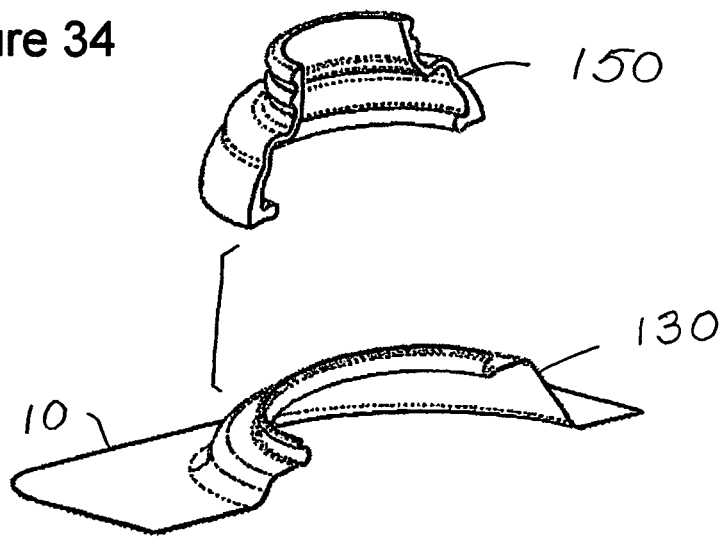
FIG. 34 is a lateral cross sectional exploded top and side perspective view of the metal base and silicone elastomer sealing part shown in FIG. 33.
Figure 35:
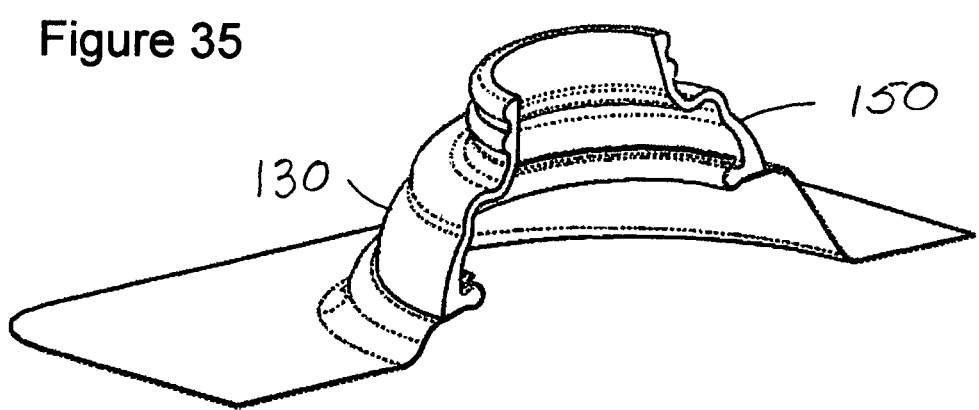
FIG. 35 is a lateral cross sectional top and side perspective view of the metal base and silicone elastomer sealing part joined before the metal part is crimped shown in FIG. 33.
Figure 36:
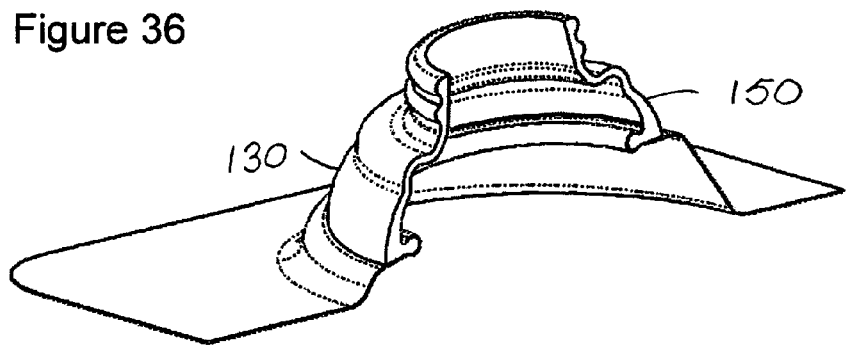
FIG. 36 is a lateral cross sectional top and side perspective view of the metal base and silicone elastomer sealing part joined after the metal part is crimped shown in FIG. 33.
Figure 37:
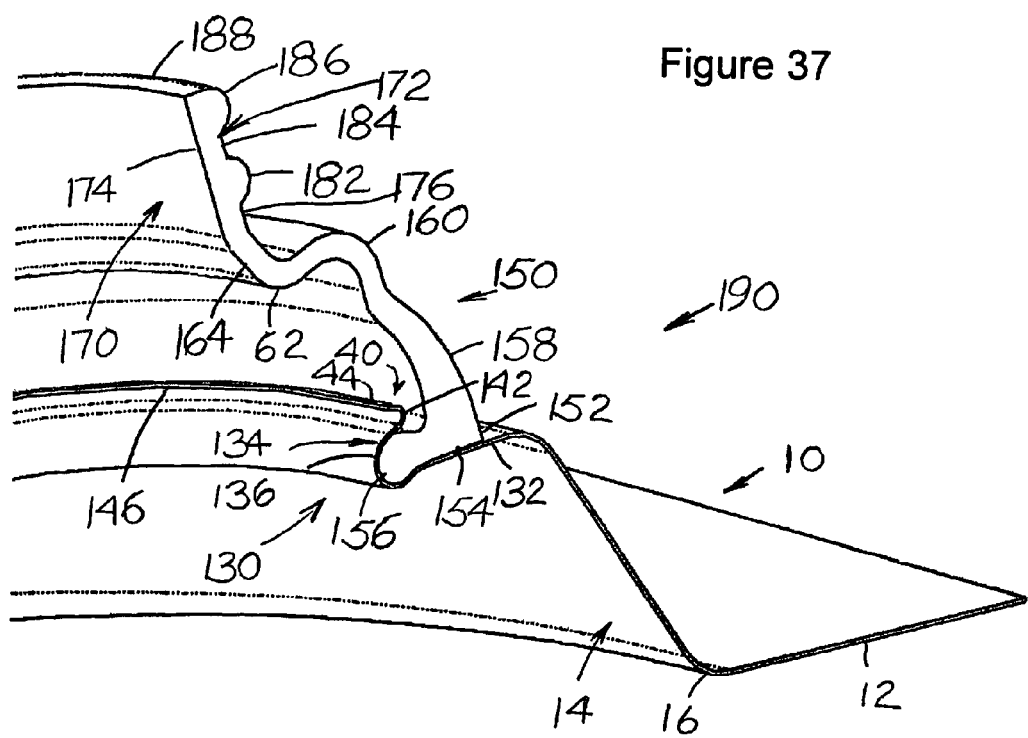
FIG. 37 is a top and side perspective quarter section detail of the joined metal base and silicone elastomer part before the inner lip of the metal base is crimped around the bulbous inner edge of the lower end of the silicone elastomer part.
Figure 38:
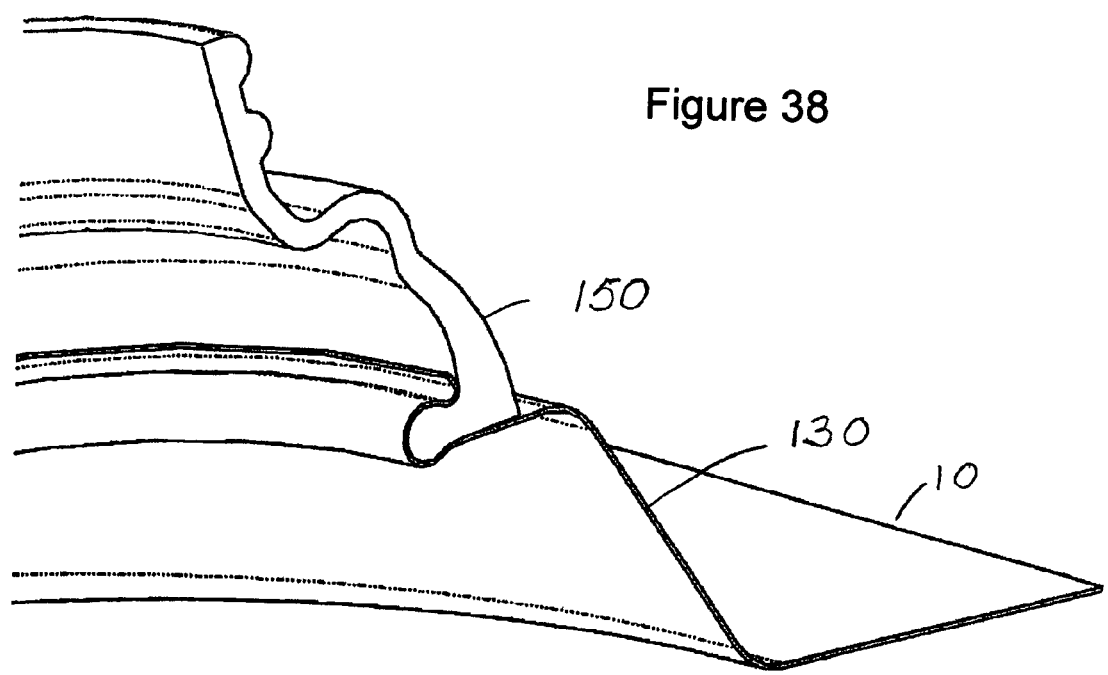
FIG. 38 is a top and side perspective quarter section detail of the joined metal base and silicone elastomer part after the inner lip of the metal base is crimped around the bulbous inner edge of the lower end of the silicone elastomer part.

FIG. 33 shows the die formed metal plate 10 and the silicone elastomer flexible member 150 and their interconnection in subassembly 190 by crimping.

Figure 30:
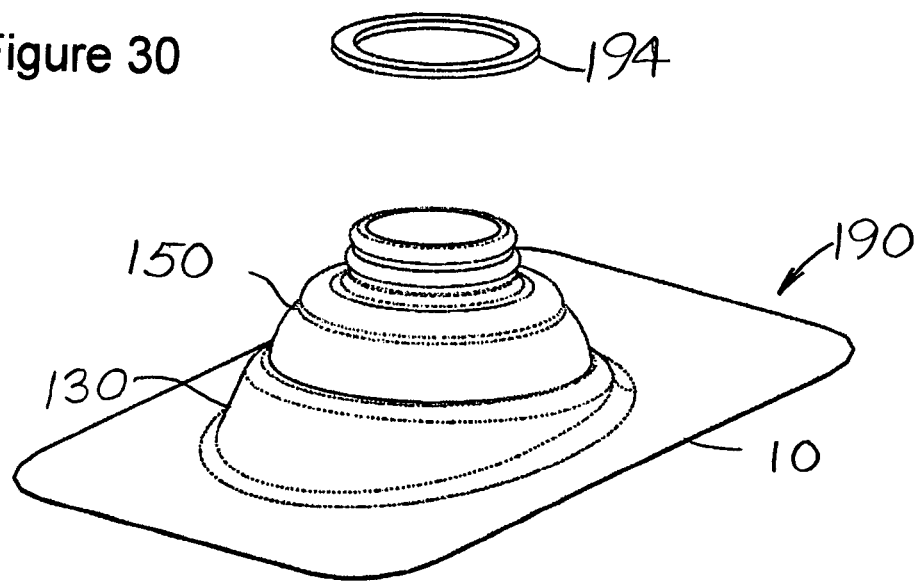
FIG. 30 is an exploded perspective view to the new seal assembly.
Figure 31:
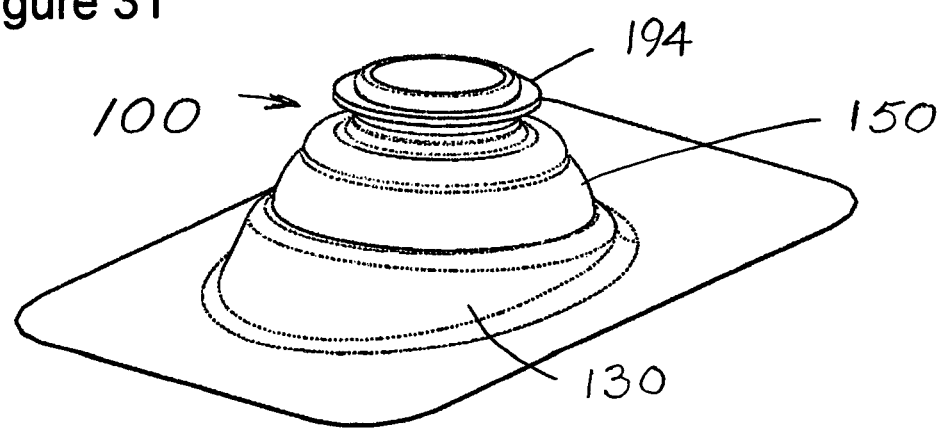
FIG. 31 is a top and side perspective view showing the assembled new seal as it is boxed and shipped from the factory and taken out of an individual box at the installation site.
Figure 32:
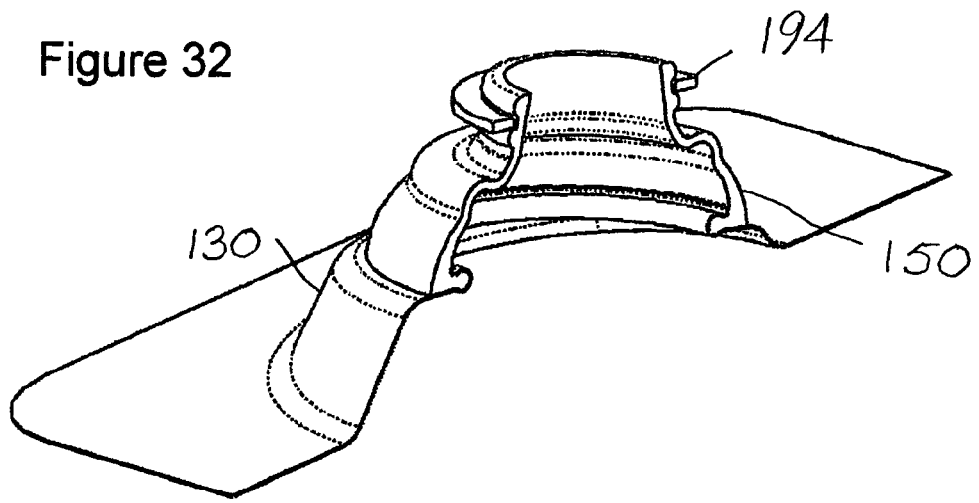
FIG. 32 is a perspective lateral cross section of the assembled new seal as shown in FIG. 31.

A compression ring 194 as shown in FIG. 30 is added to the subassembly 190 as shown in FIG. 31 to complete the seal assembly 210.

Figure 20:
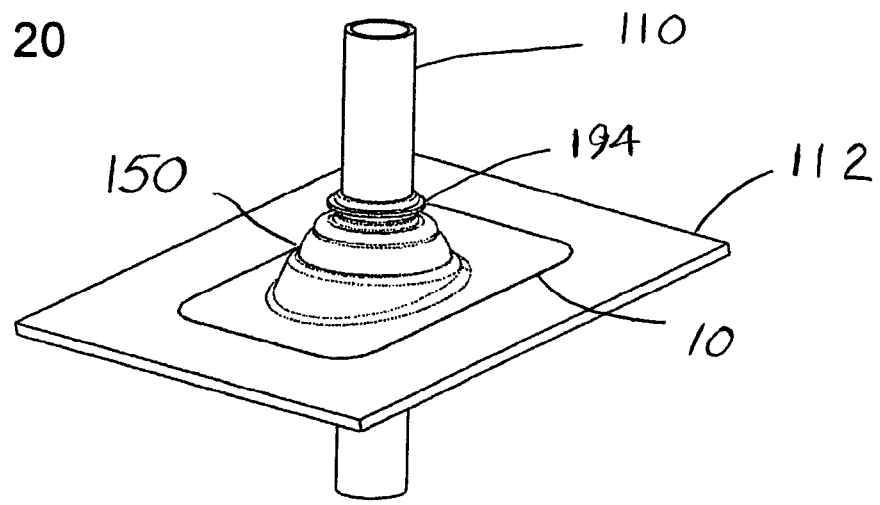
FIG. 20 is a perspective view of a top and side of a plate, sleeve and ring assembly and a base assembly on a through-the-roof pipe ready for adding the roof coverings, shingles, tiles or sheets.
Figure 21:
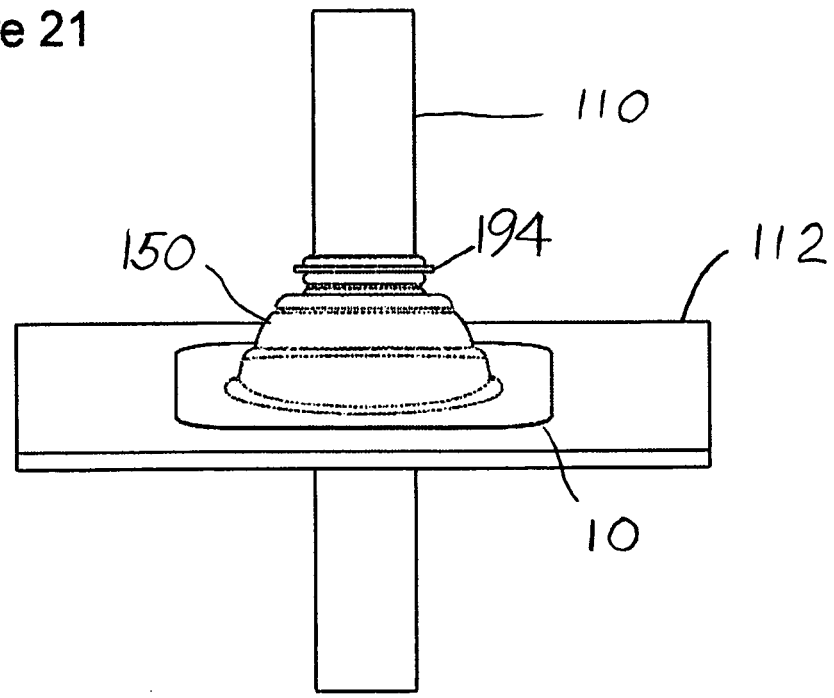
FIG. 21 is an elevation taken from a lower ends of the assembly shown in FIG. 20.
Figure 22:
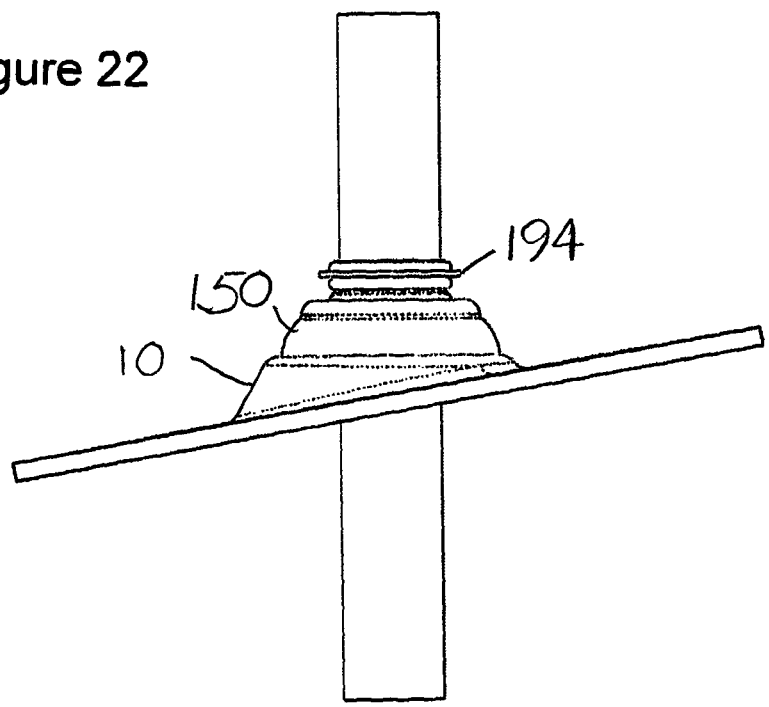
FIG. 22 is a side elevation of the assembly shown in FIG. 20.
Figure 23:
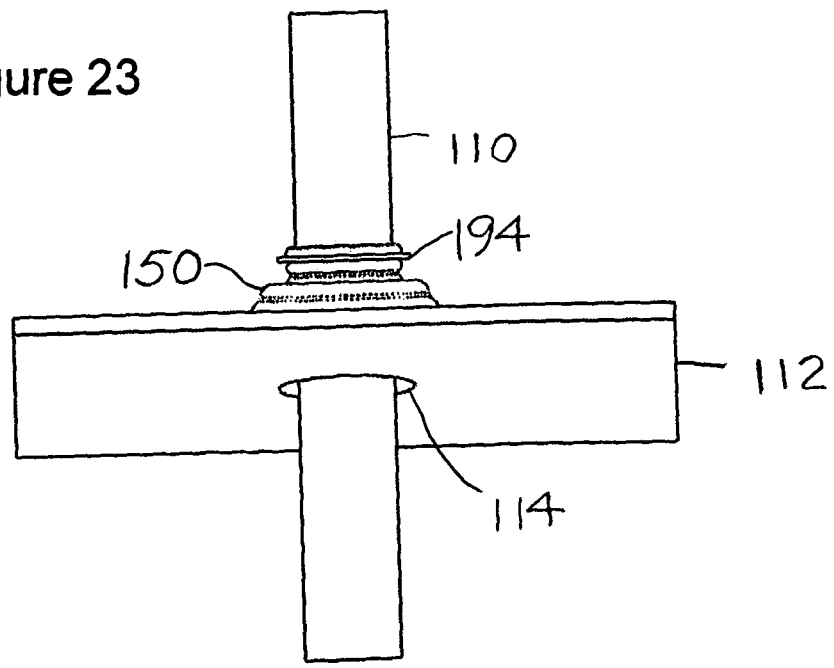
FIG. 23 is an elevation taken from the upper end of the assembly shown in FIG. 20.
Figure 24:
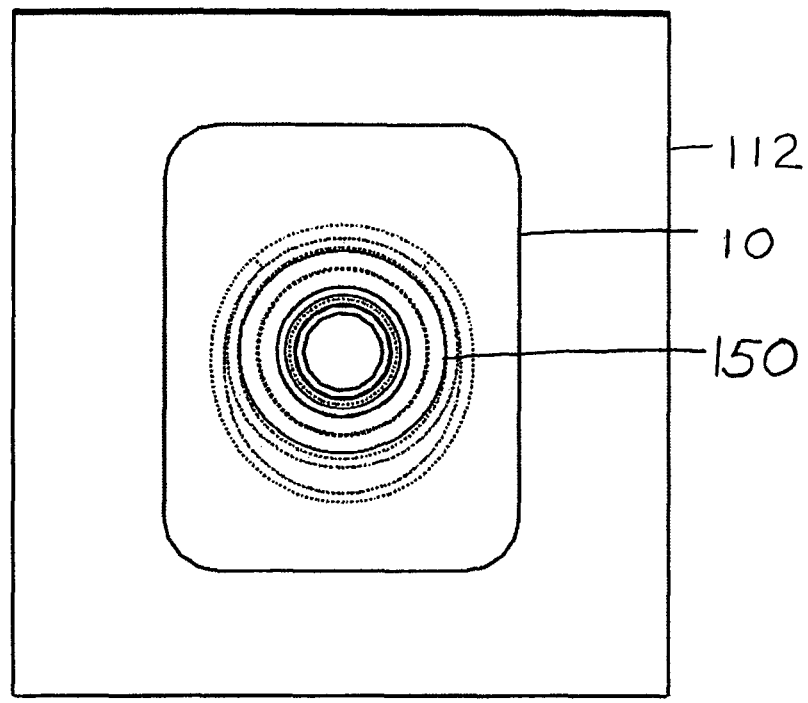
FIG. 24 is a plan view of the invention perpendicular to a roof.
Figure 25:
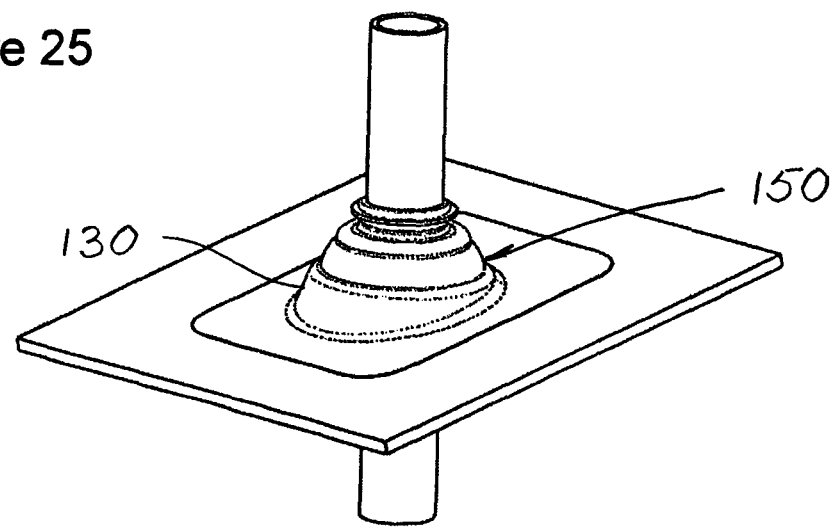
FIG. 25 is a top and side perspective view of the through-roof pipe seal.
Figure 26:
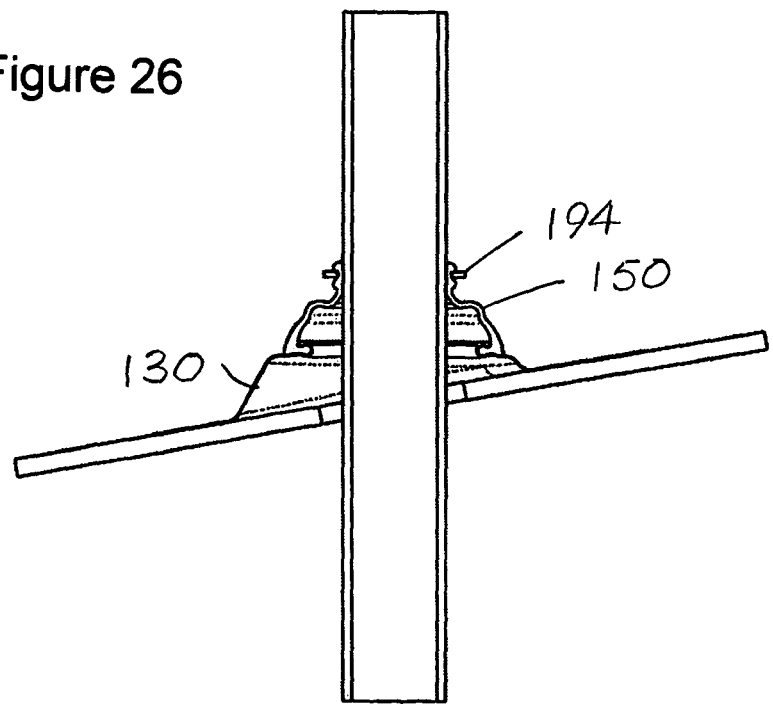
FIG. 26 is a lateral cross sectional elevation of the through-roof pipe seal.
Figure 27:
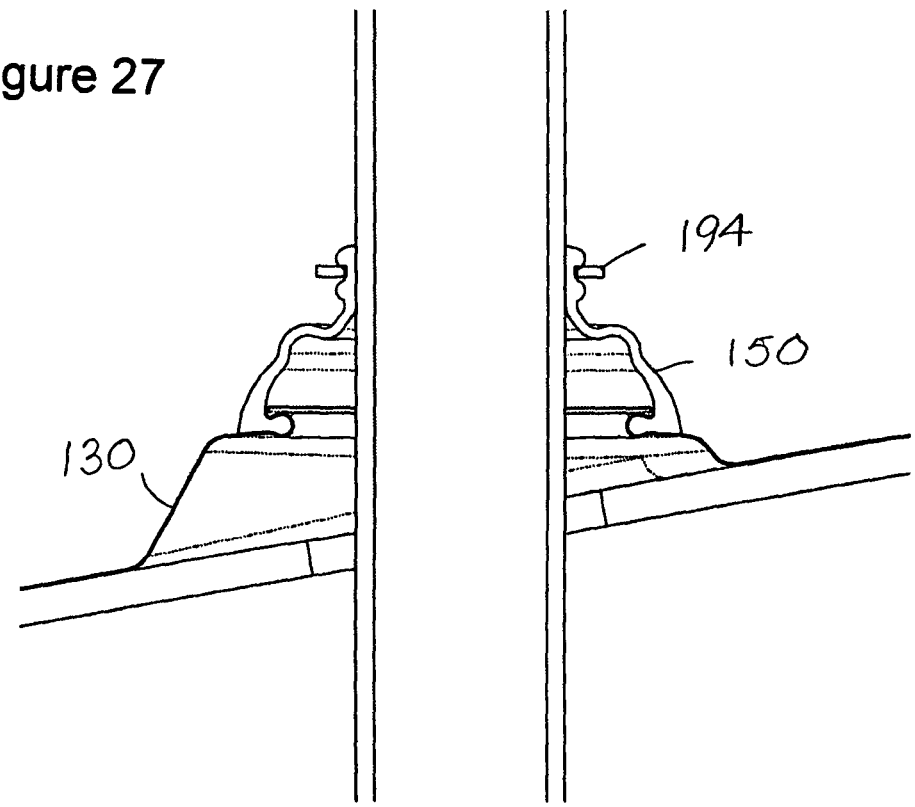
FIG. 27 is an enlarged detail of the lateral cross sections shown in FIG. 26.
Figure 28:
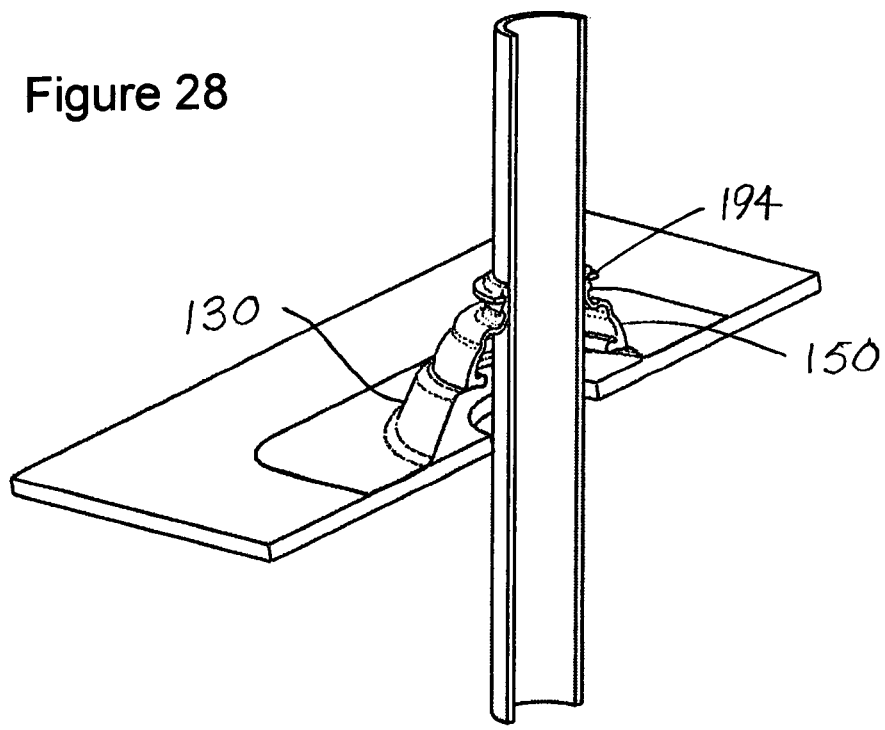
FIG. 28 is a perspective view of lateral sections shown in FIG. 26.
Figure 29:
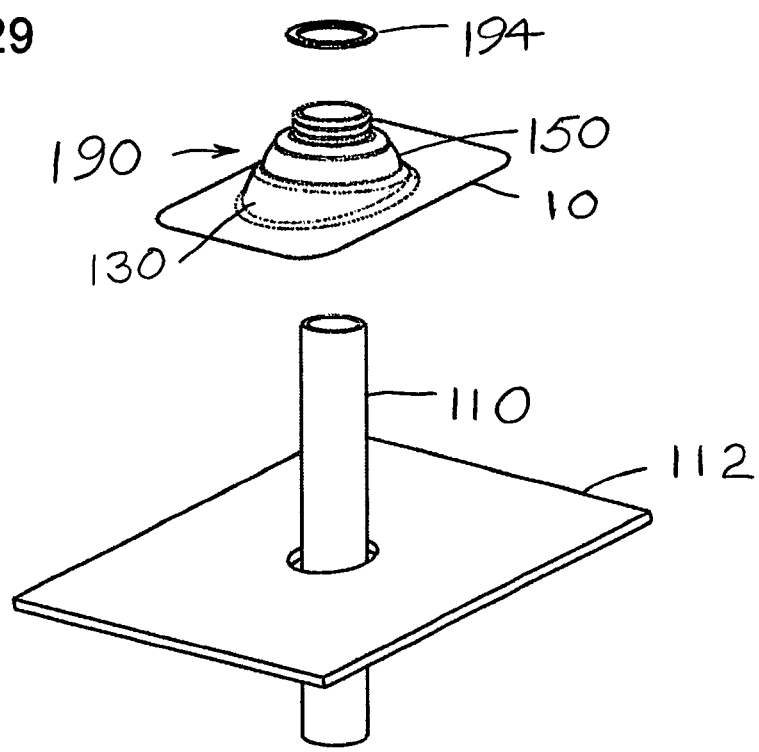
FIG. 29 is an exploded perspective view to the new seal assembly showing the pipe to be sealed.

FIG. 20 shows the subassembly 190 and compression ring 192, the through-roof pipe 110 to be sealed and the roof section 112.

FIG. 20 shows the pipe 110 extending through the roof 112 and the seal assembly 100 pushed down on the pipe 110 and in contact with the roof.

Compression ring 192 is held in the groove 184 between integral half O-ring beads 182 and 186 and is made of the same materials as pipe 110.

That material is usually PVC, polyvinylchloride. The ring 192 expands and contracts radially in the same manner and in reaction to experiencing the same conditions as the pipe 110.

The silicone elastomer seal 150 has its lower end crimped to the metal base 10. The silicone elastomer seal 150 has its upper portion 170 compressed against pipe 110 by the two integrally formed half O-ring beads 182, 186 and the compression of section 184 by compression ring 194. The body of seal 150 flexes according to the conditions which axially expand and contract the pipe 110.

The silicone elastomer seal 150 remains unaffected by heat, cold, solar radiation, flexing and exposure to environments to which the roof is exposed.

The metal base 10 is nailed to the roof 112 and is held in place by nails along the upper edge and upper side edges which are covered by the above roof covering materials.

The hole 114 in the roof 112 surrounds the pipe 110. The silicone elastomer seal 150 flexes and maintains its tight sealing connections with the metal base 10 and the pipe 110.

The elastomeric seal member 150 has redundant seal bead rings 182, 186 with heavy cross-sectional areas, squeezing the pipe 110 outer surface in two places separated by a thinner cross-section of material 184.

This thinner cross-section of material 184 is in contact with the exterior surface of the pipe and is compressed against the pipe by the rigid plastic ring structure 194 external to the elastomeric seal member 150. The inner diameter of the rigid plastic ring structure 194 is of a size that will self-retain between the two heavy cross-sectional areas 182, 186 on the elastomeric seal member 150 and of a size that will apply a known compression (percentage squeeze) on the thin cross-section of material 184 when installed over the pipe 110.

This rigid plastic ring structure 194 is manufactured from a material similar to the pipe 110, exhibiting similar differential thermal expansion factors, so that when the environmental temperature is changing, the rigid ring structure and the pipe sizes will be changing with temperature at similar rates—keeping the elastomeric material in the thin cross-section compressed at a uniform rate during the temperature excursions.

The outer diameter (OD) and geometry of the rigid plastic ring structure 194 is large enough to provide the structure required and small enough to be unaffected by snow or ice loads. The OD and geometry also serves to act as a sun shield for the lower bead 182 of the two heavy cross-sectional area half O-ring bead features—further protecting it from damaging UV degradation.

The material chosen for the elastomeric member is a soft durometer silicone material. This should provide the greatest life expectancy available from any commercially available elastomeric material. The fabrication process for the elastomeric member is compression molding. This provides good dimensional stability, excellent vulcanization and provides uniform and consistent properties throughout the part.

The shape and geometry of the elastomeric member between the heavy cross-section rings and the attachment bead to the metal transition part specifically allows flexure and bending as will be required when the seal apparatus is used on roof structures of various slopes. For example, the figures attached represent a low-pitch or shallow sloped roof structure; however, the same seal apparatus could be used on a much steeper or higher pitch roof. The flexural properties of the elastomeric member combined with the geometry of the elastomeric member allow the seal apparatus to be applied to roof structures from near to flat (2/12) to extremely steep (18/12).

The elastomeric member is attached to a metal element for transitioning and sealing to the roof covering materials. The attachment is made using a crimp—deforming the metal part in a non-elastic manner around a feature on the elastomeric part bead trapping and compressing the elastomeric part bead feature to provide a seal between the elastomeric part and the metal part.

This crimp assembly feature is geometrically radial and facing outward—away from the pipe element space. This arrangement provides a crimp assembly that will withstand the forces on the assembly from movement of the pipe relative to the roof structure due to thermal effects. This arrangement provides a strong ring structure that will resist deformation under snow and ice loads, even side loads due to snow/ice pack sliding down the roof.

The geometry of the metal transition part between the crimped bead feature and the flat flange for integrating with the roof covering provides the clearance area necessary to use the seal apparatus with roof structures of various slopes. The elongated oval structure allows the metal transition piece to be rotated upward for steeper sloped roof structures and still allows ample clearance for the pipe element. The topmost portion of the metal transition part upon which the crimping feature is formed is angled at a slight angle to assist in gaining the greatest range of roof structure slope acceptance by the seal apparatus. In addition, the slight slope helps in very low slope—near to flat—installations to shed rain and prevent moisture pooling.

The geometry of the elastomeric member adjacent to the seal bead feature provides a heavy wall section that overlaps the adjacent metal transition part. The feature helps to shed rain and to prevent ice from pushing the elastomer away from the metal transition part.

Either during manufacture or on-location at the time of installation, a lubricant material will be applied to the interior surface of the elastomeric member. This lubricant will help during the installation of the seal apparatus over the pipe element and along the pipe element until the metal transition part is situated firmly against the roof substrate. An element or feature may be integrated into the inside surface of the elastomer member to help retain this lubricant during the installation-over-the-pipe operation.

The use of this seal apparatus, including the lubricant and the rigid plastic ring structure, along with the pipe and roof covering materials to be sealed, constitute a system for sealing a pipe penetration through a structure.

The method for sealing a pipe penetration through a roof structure includes: establishing a roof structure; establishing a pipe penetrations through said roof structure; applying the rigid plastic ring structure to the seal apparatus; applying the seal apparatus, with the rigid plastic ring structure in place and including lubricant over the pipe; sliding the seal apparatus along said pipe until it rests firmly on said roof structure; affixing the seal apparatus to said roof structure along the topmost edge; and applying the roof covering material upward, under and then over the flange portion of the seal apparatus in accordance with proper flashing and rain shedding techniques.

When the base is made of a rigid plastic material, the upper elastomer part may be compression molded on the base.

The roof penetration sealing system is used with a roof substrate to which a member is fixed or with an access opening through which a penetrating member passes. A mount, attachment, stud, support member, pipe or stanchion extends through or from the roof substrate. The seal apparatuses comprised of a rigid base plate, inseparably assembled to a flexible transition element, and a compression element affixed thereto between beads on a sealing portion. Lubricant is applied to the indicated sliding surfaces. Roof covering materials are used to cover the roof substrate and the plate. When used as a system these elements combine to provide a sealing system that will provide a like span of at least the lifespan of the roof covering materials.

The roof penetration sealing apparatus includes a rigid base element, a flexible transition element with a sealing portion, and a rigid compression element.

The method for sealing a roof penetration includes the steps of: establishing or exposing a roof structure; establishing an extension through or on the roof structure; installing over the extension the sealing apparatus, including the flexible transition element with the sealing portion and the rigid compression member on the sealing portion and the lubricant inside the sealing portion, pushing the sealing apparatus down along the extension. Sliding the sealing apparatus down along the extension until the base plate seats firmly on the roof substrate surface, and affixing an upper edge of the base plate to the roof structure. Applying the roof covering material in the conventional manner, over and under the base plate of the sealing apparatus adequately flashes the sealing apparatus to provide rain shedding.

While the invention has been described with reference to specific embodiments, modifications and variations of the invention may be constructed without departing from the scope of the invention, which is defined in the following claims.

I claim:

1. Apparatus comprising:
    a plate having an upper edge portion for attaching to a sloped roof structure;
    a flexible elastomeric transition element permanently attached to the plate;
    an upper reinforced sealing portion of the flexible transition element having a smooth inner surface for surrounding, stretching over and compressing against an object extending from the sloped roof structure; and
    an outward extending rigid compression ring having a fixed inner diameter extending outward from the sealing portion for compressing the sealing portion and the smooth inner surface against the object.

2. The apparatus of claim 1, wherein the rigid compression ring is secured on the sealing portion opposite the smooth surface in preparation for placing the plate, the flexible transition element and the sealing portion on the object to be sealed and sliding the smooth inner surface along the object while outwardly stretching the sealing portion, and compressing the sealing portion between the rigid compression ring and the object.

3. The apparatus of claim 2, wherein the sealing portion has an outward extending bead formed on an end of the sealing portion.

4. The apparatus of claim 3, wherein the sealing portion has a second outward extending bead formed on the sealing portion spaced from the bead on the end of the sealing portion.

5. The apparatus of claim 4, wherein the rigid compression ring is externally placed on the sealing portion between the two beads.

6. The apparatus of claim 5, wherein the rigid compression ring is adapted to have thermal expansion and contraction characteristics substantially the same as thermal expansion and contraction characteristics of the object.

7. The apparatus of claim 5, wherein the plate and the flexible elastomeric transition element are inseparable and the rigid compression ring is placed between the two beads before the plate and flexible elastomeric transition element are placed on the object, whereupon the rigid compression ring and the elastomeric transition element become inseparable after the elastomeric transition is placed on the object.

8. The apparatus of claim 3, wherein the rigid compression ring is placed on the sealing portion parallel to the bead.

9. The apparatus of claim 8, wherein the rigid compression ring is adapted to have thermal expansion and contraction characteristics substantially the same as thermal expansion and contraction characteristics of the object.

10. The apparatus of claim 9, wherein the object is a pipe and of the fixed inner diameter of the rigid compression ring is slightly larger than an outer diameter of the pipe for squeezing and compressing the sealing portion between the pipe and the ring.

11. The apparatus of claim 1, wherein the object is a pipe and the fixed inner diameter of the rigid compression ring is slightly larger than an outer diameter of the pipe for squeezing and compressing the sealing portion between the pipe and the rigid compression ring.

12. The apparatus of claim 1, wherein the plate has a raised and open central portion extending inwardly in a ledge and a curved re-entrant bend forming a groove and terminating in an inward and downward curve and flared inward and downward edge portion.

13. The apparatus of claim 12, wherein the flexible elastomeric transition element is made of compression molded silicone and has the seal portion molded on one end, a flexible middle portion and an enlarged portion, the enlarged portion having a complementary ledge fitting on the plate ledge and terminating in a rounded end spaced away from the complementary ledge and secured in the groove of the plate by crimping walls of the groove inward around the rounded end of the enlarged portion with a raw edge of the flared edge portion pointing inward and downward away from the enlarged portion.

14. The apparatus of claim 13, wherein the raised open central portion, the ledge and the groove of the plate and part of the flexible middle portion, the enlarged portion, the complementary ledge and the rounded edge are oval.

15. The apparatus of claim 1, wherein the plate and the flexible elastomeric transition element are inseparable.

16. The apparatus of claim 1, further comprising the transition element having an outward extending shelf portion, a rounded portion and side wall portions with varied lengths connected between the rounded portion and the sealing portion, and wherein the plate is connected to the shelf portion, wherein the rounded portion and the side wall portions cooperate to accommodate varied angular relations of the sealing portion and the plate.

17. Apparatus comprising:
   a plate having a base with an upper edge portion for attaching to a roof structure, and having a raised central portion with an upper ledge at an angle to the base and walls between the base and ledge, the walls increasing in height away from the upper edge portion of the base, and a rounded groove extending inward from the ledge;
   a silicone flexible transition element having an enlarged portion with a rounded end permanently fixed within the groove and holding a complementary ledge tightly against the plate central portion ledge, the flexible transition element having a flexible middle portion and a sealing portion at an upper end;
   the sealing portion having an inner surface for contacting an exterior of an object to be sealed; and
   two spaced parallel outward extensions on the seal portion, and a rigid annular compression device having a fixed inner diameter mounted between the outward extensions, the rigid annular compression device is adapted to have thermal expansion characteristics substantially the same as thermal expansion characteristics of the object.

18. A method of sealing a roof penetration comprising:
   providing a flexible silicone elastomeric seal having a seal portion with spaced outward extending reinforcing extensions and an inner surface matching an outer surface of the roof penetration to be sealed;
   providing a rigid annular compression device having a fixed inner dimension less than a combined thickness of the seal portion and outer dimension of the roof penetration, and adapted to have a thermal expansion characteristic substantially the same as a thermal expansion characteristic of the roof penetration;
   placing the rigid annular compression device on an outer surface of the seal between the spaced reinforcing extensions;
   sliding the seal along the roof penetration to an intended position;
   effecting a seal by stretching the reinforcing extensions about (or around) the roof penetration; and, by
   compressing the seal portion between the rigid annular compression device and the roof penetration.

* * * * *